(12) United States Patent
Lee et al.

(10) Patent No.: US 12,461,303 B2
(45) Date of Patent: Nov. 4, 2025

(54) PHOTONIC INTEGRATED CIRCUIT, OPTO-ELECTRONIC SYSTEM AND METHOD

(71) Applicant: EFFECT Photonics B.V., Eindhoven (NL)

(72) Inventors: Sian Chong Jeffrey Lee, Kempen (DE); Tim Koene, Utrecht (NL); Tsjerk Hans Hoekstra, Heeze (NL); Niall Patrick Kelly, Eindhoven (NL); Emil Kleijn, Son en Breugel (NL)

(73) Assignee: EFFECT Photonics B.V., Eindhoven (NL)

( * ) Notice: Subject to any disclaimer, the term of this patent is extended or adjusted under 35 U.S.C. 154(b) by 316 days.

(21) Appl. No.: 18/115,946

(22) Filed: Mar. 1, 2023

(65) Prior Publication Data

US 2023/0280529 A1 Sep. 7, 2023

(30) Foreign Application Priority Data

Mar. 3, 2022 (EP) .................................. 22160033

(51) Int. Cl.
*G02B 6/12* (2006.01)

(52) U.S. Cl.
CPC ........... *G02B 6/12004* (2013.01); *G02B 6/12* (2013.01); *G02B 6/12016* (2013.01); *G02B 2006/12145* (2013.01); *G02B 2006/12147* (2013.01)

(58) Field of Classification Search
CPC .............................. G02B 6/12; G02B 6/12004
See application file for complete search history.

(56) References Cited

U.S. PATENT DOCUMENTS

| 4,521,069 A | * | 6/1985 | Ikeda | G02F 1/3138 385/9 |
| 4,828,358 A | * | 5/1989 | Blonder | G02B 6/42 385/38 |

(Continued)

FOREIGN PATENT DOCUMENTS

| EP | 2905913 B1 | 7/2017 |
| EP | 3930222 A1 | 12/2021 |

(Continued)

OTHER PUBLICATIONS

Extended European search report for application 22160033.1, dated Sep. 20, 2022. (Year: 2022).*

(Continued)

*Primary Examiner* — Michael Stahl
(74) *Attorney, Agent, or Firm* — Hudak, Shunk & Farine Co. LPA

(57) ABSTRACT

A PIC including a plurality of optically interconnectable functional photonic blocks and a reconfigurable optical connection arrangement having a plurality of semiconductor-based optical waveguides and a plurality of controllable optical switches, at least one controllable optical switch being configurable to be in a first state allowing optical transmission or a second state preventing optical transmission. Depending on the respective first or second state of the at least one controllable optical switch, the optical connection arrangement is configured to enable at least a first set of semiconductor-based optical waveguides to provide at least one optical connection between at least two functional photonic blocks and/or a first optical access path to at least one functional photonic block. An opto-electronic system including the PIC and to a method of improved determination of an overall performance of the PIC.

12 Claims, 10 Drawing Sheets

(56) References Cited

U.S. PATENT DOCUMENTS

| | | | | |
|---|---|---|---|---|
| 5,283,844 | A * | 2/1994 | Rice | G02B 6/2817 |
| | | | | 385/44 |
| 5,528,710 | A * | 6/1996 | Burton | G02F 1/313 |
| | | | | 385/16 |
| 9,178,610 | B1 * | 11/2015 | Chan | H04B 10/2589 |
| 9,887,780 | B2 | 2/2018 | Barton et al. | |
| 10,374,699 | B2 | 8/2019 | Ji et al. | |
| 11,411,643 | B1 * | 8/2022 | Chaouch | H04B 10/07 |
| 2004/0105613 | A1 * | 6/2004 | Chown | G01M 11/33 |
| | | | | 385/16 |
| 2005/0018959 | A1 * | 1/2005 | Wachsman | H04J 14/0213 |
| | | | | 385/24 |
| 2014/0043050 | A1 * | 2/2014 | Stone | H04B 17/0082 |
| | | | | 324/750.01 |
| 2015/0222968 | A1 * | 8/2015 | Garcia | H04Q 11/0005 |
| | | | | 398/48 |
| 2015/0295675 | A1 * | 10/2015 | Sugama | H04J 14/06 |
| | | | | 398/65 |
| 2017/0142503 | A1 * | 5/2017 | Takei | H04Q 11/0005 |
| 2018/0041282 | A1 * | 2/2018 | Chen | H04B 10/035 |
| 2020/0064404 | A1 * | 2/2020 | Sugiyama | G01R 31/282 |
| 2020/0280373 | A1 * | 9/2020 | Palmer | H04B 10/40 |
| 2022/0069916 | A1 * | 3/2022 | Parker | G02B 6/13 |
| 2022/0276434 | A1 * | 9/2022 | Koene | H01S 5/0265 |

FOREIGN PATENT DOCUMENTS

| | | |
|---|---|---|
| EP | 3961938 A1 | 3/2022 |
| JP | 2018-40946 A | 3/2018 |
| JP | 2020-30356 A | 2/2020 |

OTHER PUBLICATIONS

Guo, W., Two-Dimensional Optical Beam Steering With InP-Based Photonic Integrated Circuits, IEEE Journal of Selected topics in Quantum Electronics, Jul./Aug. 2013, vol. 19, No. 4, XP011508632.

Japanese Official Action mailed Jan. 23, 2024 for corresponding Japanese Application 2023-031533.

Taiwanese Search Report dated Jun. 10, 2025 for corresponding Taiwanese Application 112107583.

* cited by examiner

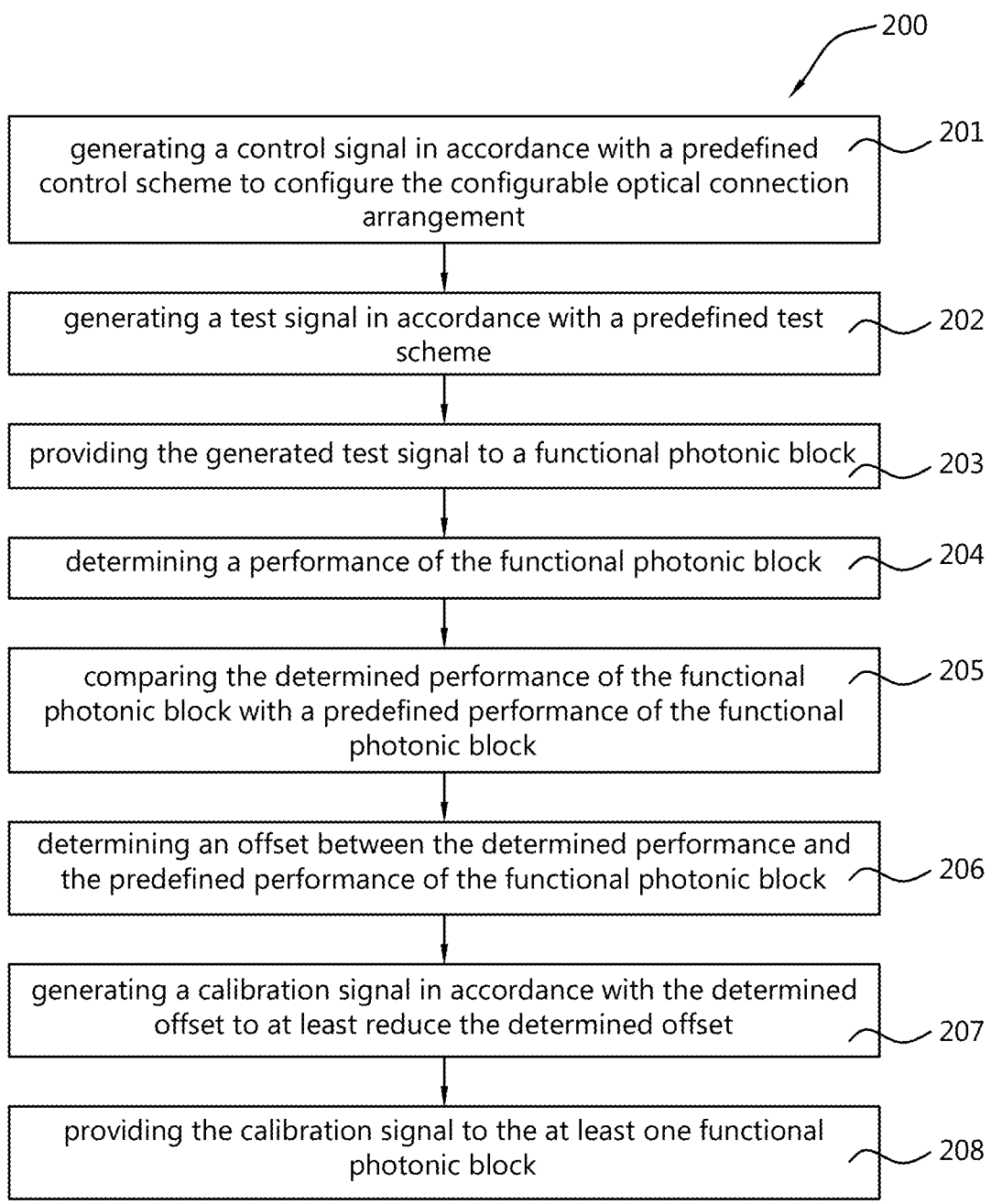

PHOTONIC INTEGRATED CIRCUIT, OPTO-ELECTRONIC SYSTEM AND METHOD

FIELD OF THE INVENTION

The present invention relates to a photonic integrated circuit (PIC) that can be used for example, but not exclusively, for telecommunication applications, Light Detection and Ranging (LIDAR) or sensor applications. The invention further relates to an opto-electronic system comprising said PIC. The invention further relates to a method of improved determination of an overall performance of said PIC.

BACKGROUND OF THE INVENTION

PICs that can be applied for example, but not exclusively, in the field of optical telecommunication applications, LIDAR or sensor applications are becoming increasingly complex with higher integration levels of diverse and specialized functional photonic blocks. In the case of for example telecommunication applications, the person skilled in the art will appreciate that modules that are generally arranged around the afore-mentioned increasingly complex PICs, require detailed health checks through a so-called optical built-in self-test (BIST) before these modules can be committed to a telecommunication link. As the overall performance of the afore-mentioned increasingly complex PICs is a convolution of multiple functional photonic blocks, the person skilled in the art will appreciate that it is a common problem of such PICs that their overall performance is increasingly difficult to deconvolute. Therefore, both from a design perspective and from an operational point of view, there is an increasing need to determine the individual performance of the multiple functional photonic blocks to at least one of understand, check and optimize the overall performance of increasingly complex PICs.

SUMMARY OF THE INVENTION

It is an object of the present invention to provide a PIC that can be used for example, but not exclusively, for telecommunication applications, LIDAR or sensor applications, pre-empting or at least reducing at least one of the above-mentioned and/or other disadvantages associated with complex PICs comprising multiple functional photonic blocks known in the art.

It is also an object of the present invention to provide an opto-electronic system that can be used for example, but not exclusively, for telecommunication applications, LIDAR or sensor applications comprising a PIC according to the invention.

It is another object of the present invention to provide a method of improved determination of an overall performance of a PIC according to the invention.

Aspects of the present invention are set out in the accompanying independent and dependent claims. Features from the dependent claims may be combined with features from the independent claim as appropriate and not merely as explicitly set out in the claims. Furthermore, all features may be replaced with other technically equivalent features.

At least one of the abovementioned objects is achieved by a photonic integrated circuit (PIC) comprising:
  a plurality of optically interconnectable functional photonic blocks; and
  a reconfigurable optical connection arrangement that comprises:
    a plurality of semiconductor-based optical waveguides; and
    a plurality of controllable optical switches, at least one of the controllable optical switches in response to a control signal being configurable to be in:
      a first state in which optical transmission is allowed; or
      a second state in which optical transmission is prevented;
  wherein depending on the respective first state or second state of the at least one controllable optical switch of the plurality of controllable optical switches, the reconfigurable optical connection arrangement is configured to enable at least a first set of semiconductor-based optical waveguides of the plurality of semiconductor-based optical waveguides to provide:
    at least one optical connection between at least two functional photonic blocks of the plurality of functional photonic blocks; and/or
    a first optical access path to at least one functional photonic block of the plurality of functional photonic blocks.

In the context of the present invention, a photonic block of the plurality of photonic blocks is to be construed as a photonic component or group of photonic components that can provide the PIC with a desired functionality, for example the functionality of an optical transmitter, an optical receiver, a laser unit or an optical detector. Furthermore, the plurality of functional photonic blocks can comprise any suitable number of functional photonic blocks that can be accommodated within the physical boundaries of the die accommodating the PIC.

The plurality of functional photonic blocks can be optically interconnected in several different ways via the semiconductor-based optical waveguides of the reconfigurable optical connection arrangement depending on the respective first state or second state the at least one controllable optical switch of the reconfigurable optical connection arrangement is configured to be in. In this way, the reconfigurable optical connection arrangement enables reconfiguration of the way in which some or all functional photonic blocks of the plurality of functional photonic blocks are optically interconnected. It is also possible to exclude a specific functional photonic block or a set of functional photonic blocks from the plurality of functional photonic blocks. Based on the foregoing, the reconfigurable optical connection arrangement enables different configurations and/or functionalities of the configurable PIC.

In accordance with an exemplary embodiment of the configurable PIC, it is possible to configure the reconfigurable optical connection arrangement such that a first set of semiconductor-based optical waveguides comprises one semiconductor-based optical waveguide, several semiconductor-based optical waveguides or even all semiconductor-based optical waveguides of the plurality of semiconductor-based waveguides. In this way, several suitable configurations of at least two functional photonic blocks of the plurality of functional photonic blocks can be achieved.

In accordance with another exemplary embodiment of the PIC, it is possible to configure the reconfigurable connection arrangement such that both a first set of semiconductor-based optical waveguides and a second set of semiconductor-based optical waveguides are provided, wherein the first set of semiconductor-based optical waveguides and the second set of semiconductor-based optical waveguides can optically interconnect different sets of functional photonic blocks of the PIC. The different sets of functional photonic blocks can be optically interconnected via a semiconductor-based optical waveguide that can either be part of the first set of semiconductor-based optical waveguides or the second set of semiconductor-based optical waveguides or via a semiconductor-based optical waveguide that does not belong to any one of the first set of semiconductor-based optical waveguides and the second set of semiconductor-based optical waveguides.

Furthermore, the reconfigurable optical connection arrangement can be configured to enable a first optical access path to at least one functional photonic block of the plurality of functional photonic blocks. The first optical access path can for example be arranged between a first optical fiber-to-chip coupling location of the PIC and at least one functional photonic block of the plurality of functional photonic blocks. In this way, the reconfigurable optical connection arrangement can enable, both on-chip and off-chip, the determination of the performance of at least one of an individual functional photonic block, a set of functional photonic blocks that comprises less functional photonic blocks than the plurality of functional photonic blocks, and the plurality of functional photonic blocks as a whole. As a result, the overall performance of the PIC can be deconvoluted to the level of an individual functional photonic block and/or a set of functional photonic blocks that comprises less functional photonic blocks than the plurality of functional photonic blocks. In addition, it is possible to obtain an improved understanding of the overall performance of the PIC and/or to optimize the overall performance of the PIC.

The first optical access path can comprise a semiconductor-based optical waveguide that provides an optical input path and/or a semiconductor-based optical waveguide that provides an optical output path to at least one functional photonic block of the plurality of functional photonic blocks. In accordance with an exemplary embodiment of the PIC wherein a functional photonic block for example can be a laser unit of which the performance is to be determined, it is sufficient if the optical access path is a semiconductor-based optical waveguide that provides an optical output path via which optical radiation emitted by the laser unit can be guided to a further functional photonic block of the PIC being for example an optical detector and/or to an external optical detector that is optically connected with the PIC via an optical fiber.

In the event that the performance of the above-mentioned further functional photonic block, i.e. the optical detector, is to be determined, it is sufficient if the optical access path is a semiconductor-based optical waveguide that provides an optical input path via which optical radiation that is emitted by for example the laser unit of the above-mentioned functional photonic block or an external laser unit that is optically connected with the PIC via an optical fiber can be guided to the optical detector, i.e. the further functional photonic block.

In accordance with yet another exemplary embodiment of the PIC, the reconfigurable optical connection arrangement can be configured to optically interconnect a set of functional photonic blocks that comprises less functional photonic blocks than the plurality of functional photonic blocks and to provide the set of functional photonic blocks with an optical access path that comprises a semiconductor-based optical waveguide providing an optical input path and another semiconductor-based optical waveguide providing an optical output path to at least one functional photonic block of the set of functional photonic blocks.

In accordance with a further exemplary embodiment of the PIC, the overall performance of one or more functional photonic blocks of the plurality of functional photonic blocks that for example are configured to be a coherent optical transmitter and one or more other functional photonic blocks of the plurality of functional photonic blocks that for example are configured to be a coherent optical receiver can be determined by providing an optical loopback between the one or more functional photonic blocks forming the coherent optical transmitter and the one or more other functional photonic blocks forming the coherent optical receiver by at least one semiconductor-based optical waveguide of the reconfigurable optical connection arrangement. In the event that the performance of the combination of the coherent optical transmitter and the coherent optical receiver is to be determined by using only functional photonic blocks of the PIC, the reconfigurable optical connection arrangement can be configured such that the laser unit of the above-mentioned functional photonic block can be included in the loopback test and used as an on-chip optical local oscillator. The person skilled in the art will appreciate that instead of using the on-chip laser unit, the reconfigurable optical connection arrangement can also be configured to enable using an external laser unit that is optically connected with the PIC via an optical fiber. It is also possible to configure the reconfigurable optical connection arrangement to allow using both the on-chip laser unit and the external laser unit in the loopback test of the coherent optical transmitter and the coherent optical receiver.

In an embodiment of the PIC according to the invention, depending on the respective first state or second state of the at least one controllable optical switch of the plurality of controllable optical switches, the reconfigurable optical connection arrangement is configured to enable a second set of semiconductor-based optical waveguides of the plurality of semiconductor-based optical waveguides to provide:

optical connections between at least a first set of functional photonic blocks of the plurality of functional photonic blocks, the first set of functional photonic blocks comprising at least two functional photonic blocks and less functional photonic blocks than the plurality of functional photonic blocks; and/or a second optical access path to at least one functional photonic block of the first set of functional photonic blocks.

Because the first set of functional photonic blocks that are optically interconnectable via optical connections provided by the second set of semiconductor-based optical waveguides comprises a smaller number of functional photonic blocks than a total number of functional photonic blocks making up the plurality of functional photonic blocks, the second optical access path provided by the reconfigurable optical connection arrangement enables determining the performance of an individual functional photonic block of the first set of functional photonic blocks or of the first set of functional photonic blocks but not of the plurality of functional photonic blocks as a whole. As mentioned above, by enabling the determination of the performance of an individual functional photonic block of the first set of functional photonic blocks and/or of the performance of the first set of functional photonic blocks, the overall performance of the PIC can be deconvoluted. As a result, it is possible to obtain an improved understanding of the overall performance of the PIC and/or to optimize the overall performance of the PIC.

In an embodiment of the PIC according to the invention, the reconfigurable optical connection arrangement comprises at least one optical splitter-combiner unit that is arranged in optical connection with at least one semiconductor-based optical waveguide of the plurality of semiconductor-based optical waveguides, wherein the at least one optical splitter-combiner unit is a multimode interference-based, MMI-based, optical splitter-combiner unit. It will be appreciated that in accordance with an exemplary embodiment of the PIC, the at least one optical splitter-combiner unit can comprise an optical input interface that is optically connected with at least two semiconductor-based optical waveguides of the reconfigurable optical connection arrangement and an optical output interface that is optically connected with one semiconductor-based optical waveguide of the configurable optical connection arrangement. In accordance with this configuration of the optical splitter-combiner unit, optical radiation that is guided by the at least two semiconductor-based optical waveguides, upon being incident on the optical input interface, can be combined and fed into the semiconductor-based optical output waveguide. It will be clear that splitting of optical radiation can be achieved by using the optical splitter-combiner unit in reverse operation. Furthermore, it will be appreciated that any suitable configuration of the splitter-combiner unit can be envisaged.

In the event that the at least one optical splitter-combiner unit is an MMI-based optical splitter-combiner unit, it will be appreciated that both the optical input interface and the optical output interface of the MMI-based optical splitter-combiner unit can have any suitable number of optical input ports and optical output ports, respectively. Therefore, the MMI-based optical splitter-combiner unit can be implemented as any suitable n×m MMI, wherein n and m are natural numbers representing the number of optical input ports and optical output ports, respectively. For example a 1×2 MMI or a 2×2 MMI.

In an embodiment of the PIC according to the invention, the reconfigurable optical connection arrangement comprises an optical detector that is arranged in optical connection with at least one semiconductor-based optical waveguide of the plurality of semiconductor-based optical waveguides and at least one functional photonic block of the plurality of functional photonic blocks. The optical detector can be an indium phosphide-based (InP-based) photodiode (PD) or an InP-based semiconductor optical amplifier (SOA). The person skilled in the art will appreciate that the PD is to be electrically reverse-biased in order to detect incident optical radiation, whereas the SOA does not need to be electrically reverse-biased. However, the SOA can be electrically reverse-biased if required.

In an embodiment of the PIC according to the invention, at least one controllable optical switch of the plurality of controllable optical switches comprises an InP-based SOA. The person skilled in the art will appreciate that InP-based semiconductor materials are the semiconductor materials of choice for fabricating a SOA that can be applied in optical telecommunication applications. The InP-based SOA can be configured to be in the first state in response to a control signal that allows the InP-based SOA to be electrically forward-biased. If the InP-based SOA is in the first state, it allows optical transmission. The InP-based SOA can be configured to be in the second state in response to a control signal that allows the InP-based SOA to be electrically reverse-biased. If the InP-based SOA is in the second state, it prevents optical transmission.

In an embodiment of the PIC according to the invention, a first functional photonic block of the plurality of functional photonic blocks is configured and arranged to provide at least a part of an optical transmitter or a coherent optical transmitter, and a second functional photonic block of the plurality of functional photonic blocks is configured and arranged to provide at least a part of an optical receiver or a coherent optical receiver. Due to the reconfigurable optical connection arrangement of the PIC, it is possible to optically interconnect at least the first functional photonic block and the second functional photonic block of the plurality of functional photonic blocks to enable the PIC to be at least one of an optical transmitter, a coherent optical transmitter, an optical receiver, a coherent optical receiver, an optical transceiver, and a coherent optical transceiver. Furthermore, the reconfigurable optical connection arrangement can be configured to provide a suitable optical access path for enabling the performance of at least one of the optical transmitter, the coherent optical transmitter, the optical receiver, the coherent optical receiver, the optical transceiver, and the coherent optical transceiver to be determined. As mentioned above, if an optical local oscillator is required, it can be provided by an on-chip laser unit of another functional photonic block or by an off-chip or external laser unit that is optically connected with the PIC via an optical fiber.

In an embodiment of the PIC according to the invention, the second functional photonic block of the plurality of functional photonic blocks comprises a 90-degree optical hybrid and a third functional photonic block of the plurality of functional photonic blocks comprises a laser unit. The 90-degree optical hybrid can be used for comparing the phase of a received coherent optical signal with the constant phase of the laser unit that in such case is configured to be an optical local oscillator.

In an embodiment of the PIC according to the invention, wherein the PIC comprises a fiber-to-chip coupling location that is optically connected with the 90-degree optical hybrid of the second functional photonic block and the laser unit of the third functional photonic block via the reconfigurable optical connection arrangement that comprises a first set of at least three optical splitter-combiner units and a third set of semiconductor-based optical waveguides of the plurality of semiconductor-based optical waveguides, wherein:

a first optical splitter-combiner unit of said first set has a first end part that is provided with at least a first optical interface and a second end part that is provided with at least a second optical interface and a third optical interface;

a second optical splitter-combiner unit of said first set has a third end part that is provided with at least a fourth optical interface and a fourth end part that is provided with at least a fifth optical interface and a sixth optical interface;

a third optical splitter-combiner unit of said first set has a fifth end part that is provided with at least a seventh optical interface and a sixth end part that is provided with at least an eighth optical interface and a ninth optical interface;

the first optical interface of the first optical splitter-combiner unit is optically interconnected with the 90-degree optical hybrid of the second functional photonic block via a first semiconductor-based optical waveguide of said third set;

the second optical interface of the first optical splitter-combiner unit is optically interconnected with the fifth optical interface of the second optical splitter-combiner unit via a second semiconductor-based optical waveguide of said third set;

the third optical interface of the first optical splitter-combiner unit is optically interconnected with the eighth optical interface of the third optical splitter-combiner unit via a third semiconductor-based optical waveguide of said third set;

the fourth optical interface of the second optical splitter-combiner unit is optically interconnected with the fiber-to-chip coupling location via a fourth semiconductor-based optical waveguide of said third set;

the sixth optical interface of the second optical splitter-combiner unit is optically interconnected with the ninth optical interface of the third optical splitter-combiner unit via a fifth semiconductor-based optical waveguide of said third set; and the seventh optical interface of the third optical splitter-combiner unit is optically interconnected with the laser unit of the third functional photonic block via a sixth semiconductor-based optical waveguide of said third set.

An advantage of the above-defined integrated coherent optical receiver of the PIC according to the present invention is that it enables optical monitoring of the on-chip or internal laser unit using off-chip or external measurement equipment that is optically connected with the fiber-to-chip coupling location of the PIC. As a result of the possibility to optically monitor the performance of the on-chip or internal laser unit, calibration and in-line control of the on-chip laser unit can be improved.

Another advantage provided by the above-defined integrated coherent optical receiver is that in case of failure of the on-chip laser unit it is possible to substitute it with an off-chip laser unit that is optically connected with the fiber-to-chip coupling location of the PIC. As a result of the possibility to substitute the on-chip laser unit with an off-chip laser unit the entire PIC does not need to be discarded which would be expensive.

As mentioned above, at least one of the optical splitter-combiner units of said first set can be an MMI-based optical splitter-combiner unit that can be implemented as any suitable n×m MMI, for example a 1×2 MMI or a 2×2 MMI.

In an exemplary embodiment of the PIC according to the invention, a semiconductor-based optical waveguide of the plurality of semiconductor-based optical waveguides comprises a tapered section. The person skilled in the art will appreciate that the tapered section can be configured and arranged to enable spot-size conversion of optical radiation for reducing coupling losses at the optical interface between the semiconductor-based optical waveguide and an optical fiber at the fiber-to-chip coupling location of the PIC.

In an embodiment of the PIC according to the invention, the reconfigurable optical connection arrangement comprises:
a first controllable optical switch of the plurality of controllable optical switches that has a first end facet and a second end facet; and/or
a second controllable optical switch of the plurality of controllable optical switches that has a third end facet and a fourth end facet;
wherein:
the first end facet of the first controllable optical switch is arranged in optical communication with the fiber-to-chip coupling location of the PIC via a seventh semiconductor-based optical waveguide of said third set, and the second facet of the first controllable optical switch is arranged in optical communication with the fourth optical interface of the second optical splitter-combiner unit via the fourth semiconductor-based optical waveguide of said third set; and/or
the third end facet of the second controllable optical switch is arranged in optical communication with the laser unit of the third functional photonic block via an eighth semiconductor-based optical waveguide of said third set, and the fourth facet of the second controllable optical switch is arranged in optical communication with the seventh optical interface of the third optical splitter-combiner unit via the sixth semiconductor-based optical waveguide of said third set.

In the event that active optical monitoring of the on-chip or internal laser unit by off-chip or external measurement equipment is not required, the first controllable optical switch that is included between the second optical splitter-combiner unit and the fiber-to-chip coupling location can be reverse biased to minimize and ultimately prevent reflections of optical radiation emitted by the on-chip or internal laser unit at the fiber-to-chip coupling location.

In the event that an external or off-chip laser unit is optically connected with the fiber-to-chip coupling location, the first controllable optical switch can be forward biased to boost the optical radiation emitted by the off-chip laser unit that can be used as an external local oscillator for the coherent optical receiver of the PIC. In this case, the second controllable optical switch that can be included between the on-chip laser unit and the third optical splitter-combiner unit can be reverse biased to prevent optical radiation that is emitted by the off-chip laser unit from entering the laser cavity of the inactive on-chip laser unit to prevent undesirable resonances.

The second controllable optical switch can be forward biased in the event that the optical radiation that is emitted by the on-chip laser unit needs to be boosted.

As mentioned above, at least one of the optical splitter-combiner units of said first set can be an MMI-based optical splitter-combiner unit that can be implemented as any suitable n×m MMI. For example, the third optical splitter-combiner unit can be configured to allow inclusion of more than one on-chip laser unit in the coherent optical receiver of the PIC. An advantage of including for example two half-band tunable laser units is that the yield of the coherent optical receiver and thus of the PIC as a whole can be improved because the requirements for each individual laser unit can be lower, i.e. more relaxed.

The first controllable optical switch and the second controllable optical switch of the plurality of controllable optical switches of the reconfigurable optical connection arrangement can be InP-based SOAs.

In an embodiment of the PIC according to the invention, the plurality of controllable optical switches comprises at least three controllable optical switches. A first controllable optical switch of the at least three controllable optical switches can be used for allowing or preventing optical transmission via a semiconductor-based optical waveguide of the reconfigurable optical connection arrangement that provides an optical input path to at least one functional photonic block of the PIC. A second controllable optical switch of the at least three controllable optical switches can be used for allowing or preventing optical transmission via a semiconductor-based optical waveguide of the reconfigurable optical connection arrangement that provides an optical output path from at least one functional photonic block of the PIC. A third controllable optical switch of the at least three controllable optical switches can be used for allowing or preventing optical transmission via a semiconductor-based optical waveguide of the reconfigurable optical connection arrangement that provides an optical connection between functional photonic blocks of the PIC.

In an embodiment of the PIC according to the invention, the PIC is a hybrid PIC or an InP-based monolithic PIC. It will be appreciated that a hybrid PIC allows the advantages of the present invention to be applied both in the domain of silicon photonics as in the domain of III-V photonics. An advantage of a hybrid PIC is that functional photonic blocks comprising group III-V semiconductor materials, e.g. InP-based semiconductor materials, can be used together with functional photonic blocks comprising group IV semiconductor materials, e.g. Si-based semiconductor materials, on a single die. Another advantage of enabling hybrid integration of the PIC according to the invention is that functional photonic blocks can be exchanged for example in the case of malfunction or breakdown of a functional photonic block.

PICs that are applied for example, but not exclusively, in the field of optical telecommunication applications, LIDAR or sensor applications are becoming increasingly complex at least because of the increasing number of functional photonic blocks that are to be integrated on a single die that preferably has a footprint that is as small as possible. The person skilled in the art will appreciate that the most versatile technology platform for such PICs, especially for use in the above-mentioned application areas, uses wafers comprising InP-based semiconductor materials.

An advantage of an InP-based monolithic PIC is that both active components such as for example light-generating and/or light-absorbing optical devices, and passive components such as for example light-guiding and/or light-switching optical devices, are integrated on the same semiconductor substrate of a single die. As a result, fabrication of an InP-based monolithic PIC can be less cumbersome and therefore can be less expensive than the assembly of a hybrid PIC that requires assembly steps for the hybrid interconnection of the active and passive opto-electronic devices each of which typically are fabricated on different substrates. In addition, an InP-based monolithic PIC possibly allows the PIC to have a smaller total footprint than the total footprint of a hybrid PIC.

According to another aspect of the present invention, an opto-electronic system is provided comprising a PIC according to the invention. The opto-electronic system can for example, but not exclusively, be used for telecommunication applications, LIDAR or sensor applications.

In an embodiment of the opto-electronic system according to the invention, the opto-electronic system comprises a control unit that is operatively connected with at least one of the controllable optical switches of the plurality of controllable optical switches of the reconfigurable optical connection arrangement of the PIC, the control unit being configured to generate a control signal in accordance with a control input provided by an operator and/or a predefined control scheme, the control signal being configured to allow at least one controllable optical switch of the plurality of controllable optical switches to be configured in said first state or in said second state, wherein depending on the respective first state or second state of the at least one controllable optical switch of the plurality of controllable optical switches, the reconfigurable optical connection arrangement is configured to enable at least the first set of semiconductor-based optical waveguides of the plurality of semiconductor-based optical waveguides to provide:
  at least one optical connection between at least two functional photonic blocks of the plurality of functional photonic blocks; and/or
  the first optical access path to at least one functional photonic block of the plurality of functional photonic blocks.

By configuring the control unit to be able to generate a control signal for controlling the controllable optical switches of the reconfigurable optical connection arrangement in accordance with a predefined control scheme, the reconfigurable optical connection arrangement can be configured to allow an automated test sequence to be run for determining the performance of at least one of an individual functional photonic block, a set of individual functional blocks, and all functional photonic blocks of the plurality of functional photonic blocks of the PIC.

It is also possible that the control unit generates a control signal in accordance with a control input of an operator. In this way, manual control of the controllable optical switches of the reconfigurable optical connection arrangement can be enabled. The person skilled in the art will appreciate that the manual control can also be used to adjust or cancel a control input that would have been provided in accordance with a predefined control scheme for controlling the controllable optical switches of the configurable optical connection arrangement.

Furthermore, it is noted that the control unit can be configured and arranged in any suitable way, i.e. it can be integrated on the same die as the PIC or it can be an external control unit that is operatively connected, in a wired and/or wireless way, with the PIC.

According to yet another aspect of the present invention, a method of improved determination of an overall performance of a PIC according to the invention is provided, wherein the PIC comprises:
  a plurality of optically interconnectable functional photonic blocks; and
  a reconfigurable optical connection arrangement that comprises:
    a plurality of semiconductor-based optical waveguides; and
    a plurality of controllable optical switches, at least one of the controllable optical switches in response to a control signal being configurable to be in:
      a first state in which optical transmission is allowed; or
      a second state in which optical transmission is prevented;
  wherein depending on the respective first state or second state of the at least one controllable optical switch of the plurality of controllable optical switches, the reconfigurable optical connection arrangement is configured to enable at least a first set of semiconductor-based optical waveguides of the plurality of semiconductor-based optical waveguides to provide:
    at least one optical connection between at least two functional photonic blocks of the plurality of functional photonic blocks; and/or
    a first optical access path to at least one functional photonic block of the plurality of functional photonic blocks;
  wherein the method comprises:
    generating a control signal in accordance with a control input provided by an operator and/or a predefined control scheme to configure at least one controllable optical switch to be in a first state in which optical transmission is allowed or in a second state in which optical transmission is prevented to configure the reconfigurable optical connection arrangement to enable at least the first set of semiconductor-based optical waveguides of the plurality of semiconductor-based optical waveguides to provide at least one optical connection between at least two functional photonic blocks of the plurality of functional photonic blocks and/or the first optical access path to at least one functional photonic block of the plurality of functional photonic blocks;

generating a test signal in accordance with a test input provided by an operator and/or a predefined test scheme;

providing the generated test signal to the at least one functional photonic block of the plurality of functional photonic blocks; and determining a performance of the at least one functional photonic block of the plurality of functional photonic blocks.

The method according to the invention allows determining the performance of at least one of an individual functional photonic block, a set of functional photonic blocks that comprises less functional photonic blocks than the plurality of functional photonic blocks, and the plurality of functional photonic blocks as a whole. The person skilled in the art will appreciate that the performance of the afore-mentioned different configurations of functional photonic blocks can be determined using externally arranged test equipment such as for example a laser unit and/or an optical detector that is operatively connected with the PIC. However, it is also possible to determine the performance of the afore-mentioned different configurations of functional photonic blocks using on-chip components such as for example a laser unit and/or an optical detector that are part of functional photonic blocks of the PIC that are not included in the set of functional photonic blocks of which the performance is to be determined. In that case the method according to the invention allows to perform a so-called optical built-in self-test (BIST).

As a control signal for configuring at least one controllable optical switch can not only be generated in accordance with a control input provided by an operator but also in accordance with a predefined control scheme, the method according to the invention allows performing an automated sequence of configurations or reconfigurations of the reconfigurable optical connection arrangement for determining the performance of at least one of an individual functional photonic block, a set of functional photonic blocks that comprises less functional photonic blocks than the plurality of functional photonic blocks, and the plurality of functional photonic blocks as a whole. As mentioned above, a manual control input provided by an operator can be used to adjust or cancel a control input that would have been provided in accordance with a predefined automated control scheme.

For determining the performance of the afore-mentioned different configurations of the functional photonic blocks, a test signal in accordance with a test input provided by an operator and/or a predefined test scheme can be generated and provided to at least one of the functional photonic blocks of the PIC. The person skilled in the art will appreciate that a manual test input and/or an automated predefined test scheme can be provided, wherein at least one individual test input of the automated predefined test scheme can be adjusted and/or cancelled by manual test input provided by the operator. The automated predefined test scheme can comprise a sequence of test patterns including but not limited to at least one of data sequences, single tones and multi-tones. Although not preferable, the afore-mentioned sequence of test patterns can also be provided manually by an operator.

The person skilled in the art will appreciate that the method according to the present invention, for example in the form of an optical BIST, can be relevant for both initial testing and testing during lifetime of at least one of an individual functional photonic block, a set of functional photonic blocks that comprises less functional photonic blocks than the plurality of functional photonic blocks, and the plurality of functional photonic blocks as a whole. If the method according to the invention is performed, the PIC is in a so-called measurement state, whereas after completion of the method, the PIC is in so-called normal operation state.

As a result of the method according to the invention, the overall performance of the PIC can be deconvoluted to the level of an individual functional photonic block and/or a set of functional photonic blocks that comprises less functional photonic blocks than the plurality of functional photonic blocks. Consequently, an improved understanding of the overall performance of the PIC can be obtained and/or the overall performance of the PIC can be improved.

In an embodiment of the method according to the invention, the method further comprises:

comparing the determined performance of the at least one functional photonic block with a predefined performance of the at least one functional photonic block;

determining an offset between the determined performance and the predefined performance of the at least one functional photonic block;

generating a calibration signal in accordance with the determined offset to at least reduce the determined offset; and providing the calibration signal to the at least one functional photonic block of the plurality of functional photonic blocks.

In this way, the method of the invention can improve the overall performance of the PIC by performing a calibration of at least one of an individual functional photonic block, a set of functional photonic blocks that comprises less functional photonic blocks than the plurality of functional photonic blocks, and the plurality of functional photonic blocks as a whole.

BRIEF DESCRIPTION OF THE DRAWINGS

Further features and advantages of the invention will become apparent from the description of exemplary and non-limiting embodiments of a PIC according to the present invention, an opto-electronic system comprising such a PIC, and a method of improved determination of an overall performance of a PIC according to the present invention.

The person skilled in the art will appreciate that the described embodiments of the PIC, the method and the opto-electronic system are exemplary in nature only and not to be construed as limiting the scope of protection in any way. The person skilled in the art will realize that alternatives and equivalent embodiments of the PIC, the method and the opto-electronic system can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts. On the attached drawing sheets.

FIG. 12 shows a flow diagram of a first exemplary, non-limiting embodiment of the method according to the invention.

DETAILED DESCRIPTION OF EMBODIMENTS

Figure 1:
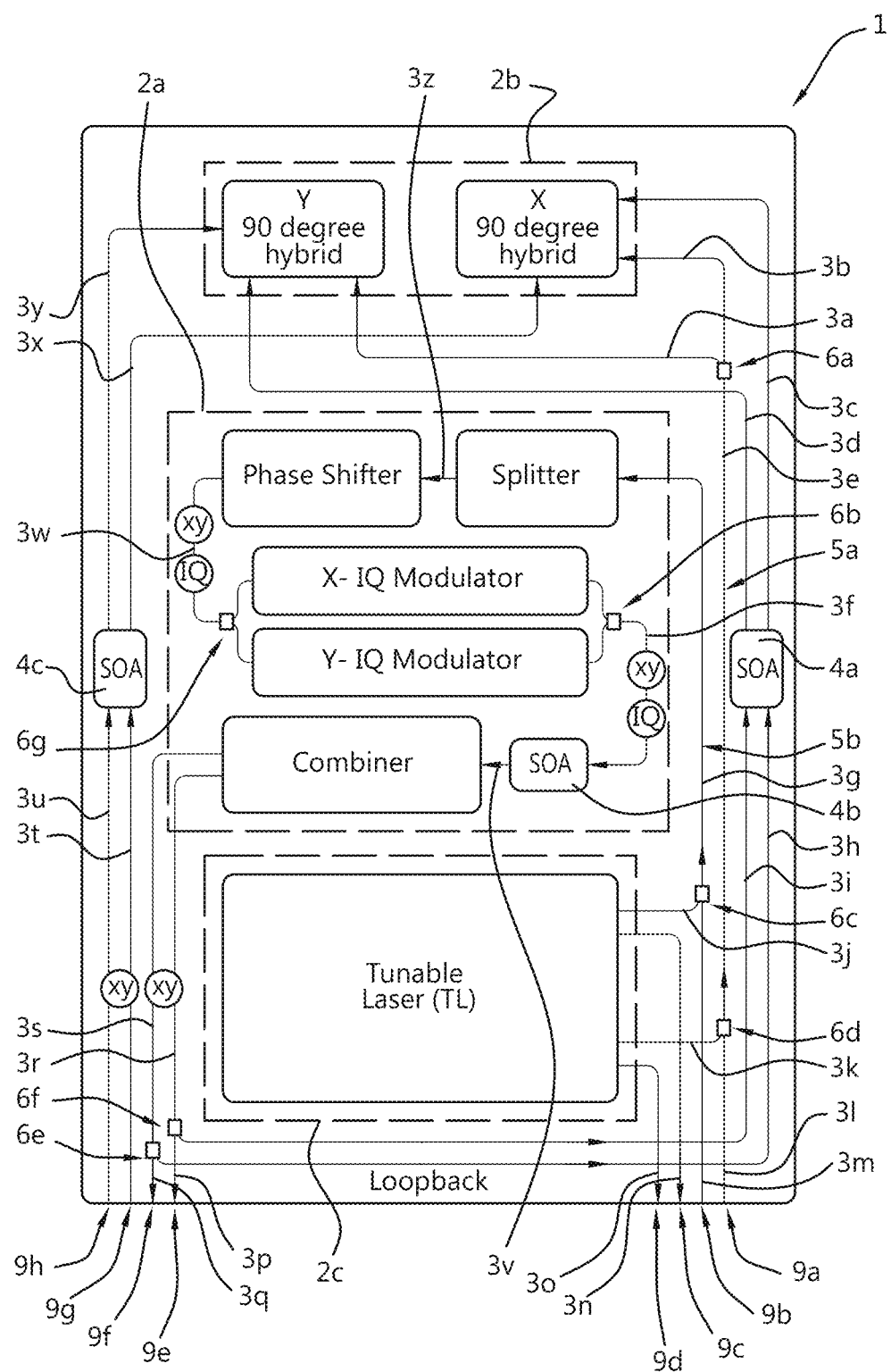
FIG. 1 shows a schematic top view of a first exemplary, non-limiting embodiment of a PIC according to the present invention that comprises three functional photonic blocks that are optically interconnectable via a configurable optical connection arrangement.

FIG. 1 shows a schematic top view of a first exemplary, non-limiting embodiment of a PIC 1 according to the present invention that comprises three functional photonic blocks 2a, 2b, 2c. For the sake of clarity the individual components making up one of these functional photonic blocks are surrounded by a dashed box. The person skilled in the art will appreciate that each of the functional photonic blocks 2a, 2b, 2c can provide the PIC 1 with any suitable type of functionality, for example the functionality of an optical transmitter, an optical receiver, a laser unit or an optical detector. In accordance with the first exemplary, non-limiting embodiment of the PIC 1 shown in FIG. 1, the first functional photonic block 2a provides the functionality of a coherent optical transmitter, the second functional photonic block 2b provides the functionality of coherent optical receiver, and the third functional photonic block 2c provides the functionality of an on-chip light source. The on-chip light source can be an integrated tunable laser unit.

Figure 11:
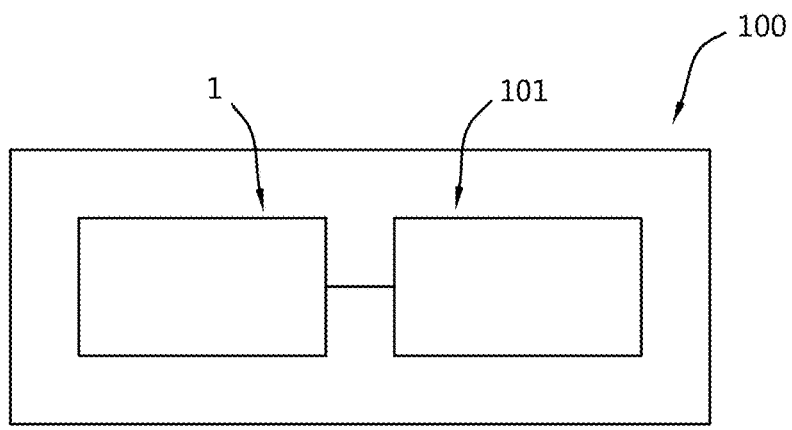
FIG. 11 shows a schematic top view of a first exemplary, non-limiting embodiment of an opto-electronic system that can be used for example, but not exclusively, for telecommunication applications, LIDAR or sensor applications, the opto-electronic system comprising a PIC according to the present invention.

The three functional photonic blocks 2a, 2b, 2c of the PIC 1 are optically interconnectable via a reconfigurable optical connection arrangement that comprises a semiconductor-based optical waveguides 3a-3z of the plurality of semiconductor-based optical waveguides 3a-3ah, and three controllable optical switches 4a, 4b, 4c. In response to a control signal that can be provided by a control unit 101, which is schematically shown in FIG. 11, at least one of the three controllable optical switches 4a, 4b, 4c is configurable to be in a first state in which optical transmission is allowed or in a second state in which optical transmission is prevented.

As will be elucidated in particular but not exclusively with respect to FIGS. 2-7, depending on the respective first state or second state the three controllable optical switches 4a, 4b, 4c are configured to be in, the reconfigurable optical connection arrangement can be configured to enable at least a first set of semiconductor-based optical waveguides of the plurality of semiconductor-based optical waveguides to provide at least one optical connection 5a, 5b between at least two functional photonic blocks of the three functional photonic blocks 2a, 2b, 2c and/or a first optical access path to at least one functional photonic block of the three functional photonic blocks 2a, 2b, 2c. In this way, the reconfigurable optical connection arrangement enables configuration and/or reconfiguration of the way in which some or all functional photonic blocks 2a, 2b, 2c are optically interconnected. As will be illustrated, it is also possible to exclude a specific functional photonic block or a set of functional photonic blocks from the three functional photonic blocks 2a, 2b, 2c. Based on the foregoing, the reconfigurable optical connection arrangement enables different configurations and/or functionalities of the reconfigurable PIC 1.

As will be elucidated in particular but not exclusively with respect to FIGS. 2-5, the reconfigurable optical connection arrangement of the PIC 1 can be configured to provide a suitable optical access path for enabling the performance of at least one of the functional photonic blocks. The optical light source of the third functional photonic block 2c can for example be used as an optical local oscillator. The person skilled in the art will appreciate that the optical local oscillator can also be provided by an external laser unit that is optically connected with the PIC 1 via an optical fiber. This will be elucidated in particular with respect to FIGS. 8-10.

In accordance with the first exemplary, non-limiting embodiment of the PIC 1 shown in FIG. 1, it is noted that the three controllable optical switches 4a, 4b, 4c comprise an InP-based SOA. As mentioned above, the person skilled in the art will appreciate that InP-based semiconductor materials are the semiconductor materials of choice for fabricating a SOA that can be applied in optical telecommunication applications. The InP-based SOA can be configured to be in the first state in response to a control signal that allows the InP-based SOA to be electrically forward-biased. If the InP-based SOA is in the first state, it allows optical transmission. The InP-based SOA can be configured to be in the second state in response to a control signal that allows the InP-based SOA to be electrically reverse-biased. If the InP-based SOA is in the second state, it prevents optical transmission.

The PIC 1 can be a hybrid PIC or an InP-based monolithic PIC. As described above, a hybrid PIC allows the advantages of the present invention to be applied both in the domain of silicon photonics as in the domain of III-V photonics. An advantage of a hybrid PIC is that the on-chip light source of the third functional photonic block 2c can be a group III-V, e.g. InP-based, tunable laser unit that can be integrated on a single die with functional photonic blocks comprising group IV semiconductor materials, e.g. Si-based photonic devices. Another advantage of enabling hybrid integration of the PIC 1 according to the invention is that functional photonic blocks can be exchanged for example in the case of malfunction or breakdown of a functional photonic block.

Regarding monolithic PICs, it is noted that the most versatile technology platform for such PICs, especially for use in the above-mentioned application areas, uses wafers comprising InP-based semiconductor materials. An advantage of an InP-based monolithic PIC is that both active components such as for example light-generating and/or light-absorbing optical devices, and passive components such as for example light-guiding and/or light-switching optical devices, are integrated on the same semiconductor substrate of a single die. As a result, fabrication of an InP-based monolithic PIC can be less cumbersome and therefore can be less expensive than the assembly of a hybrid PIC that requires assembly steps for the hybrid interconnection of the active and passive opto-electronic devices each of which typically are fabricated on different substrates. In addition, an InP-based monolithic PIC can have a smaller total footprint than the total footprint of a hybrid PIC.

In accordance with the first exemplary, non-limiting embodiment of the PIC 1 shown in FIG. 1, the reconfigurable optical connection arrangement comprises optical splitter-combiner units 6a-6g, each of which is arranged in optical connection with at least one semiconductor-based optical waveguide of the plurality of semiconductor-based optical waveguides. As shown in FIG. 1, each of the optical splitter-combiner units 6b, 6c, 6d comprises an optical input interface that is optically connected with two semiconductor-based optical waveguides and an optical output interface that is optically connected with one semiconductor-based optical waveguide. In accordance with this configuration of the optical splitter-combiner unit, optical radiation that is guided by the at least two semiconductor-based optical waveguides, upon being incident on the optical input interface, can be combined and fed into the semiconductor-based optical output waveguide. Each of the optical splitter-combiner units 6a, 6e, 6f, 6g comprises an optical input interface that is optically connected with one semiconductor-based optical waveguide and an optical output interface that is optically connected with two semiconductor-based optical waveguides. In this way, optical radiation that is incident on the optical input interface can be split and distributed over the two semiconductor-based optical output waveguides. The optical splitter-combiner units 6a-6g can be MMI-based optical splitter-combiner units having any suitable number of optical input ports and optical output ports, respectively, such as for example a 1×2 MMI as shown in FIG. 1.

Figure 2:
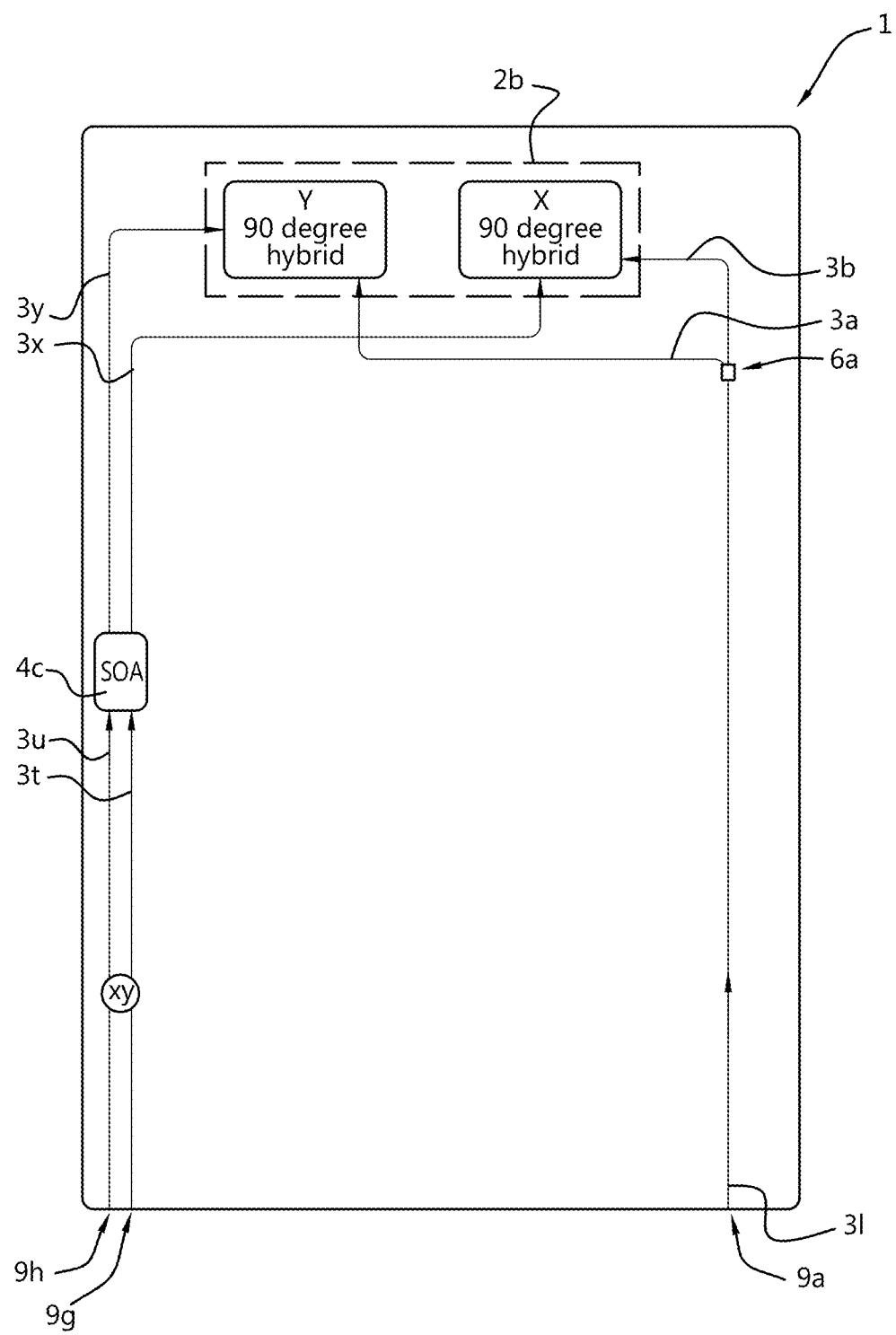
FIG. 2 shows a schematic top view of a first configuration of the first exemplary, non-limiting embodiment of the PIC shown in FIG. 1.

FIG. 2 shows a schematic top view of a first configuration of the first exemplary, non-limiting embodiment of the PIC 1 shown in FIG. 1, wherein the first controllable optical switch 4a and the second controllable optical switch 4b are configured to be in the second state in which optical transmission is prevented, and the third controllable optical switch 4c is configured to be in the first state in which optical transmission is allowed. As a result, the reconfigurable optical connection arrangement is configured to enable an optical access path comprising a first set of semiconductor-based optical waveguides 3a, 3b, 3l, 3t, 3u, 3x, 3y of the plurality of semiconductor-based optical waveguides to the second functional photonic block 2b that provides the PIC with the functionality of a coherent optical receiver. In this way, the reconfigurable optical connection arrangement enables determining the performance of the coherent optical receiver in a stand-alone manner, i.e. isolated from the PIC 1 as a whole. It is noted that the first functional photonic block 2a, the third functional photonic block 2c, the first controllable optical switch 4a, the second controllable optical switch 4b, and the semiconductor-based optical waveguides 3c-3k, 3m-3s, 3v, 3w, 3z of the plurality of semiconductor-based optical waveguides are not shown for the sake of clarity to emphasize the optically accessible part of the PIC 1 of which the performance can be determined.

Figure 3:
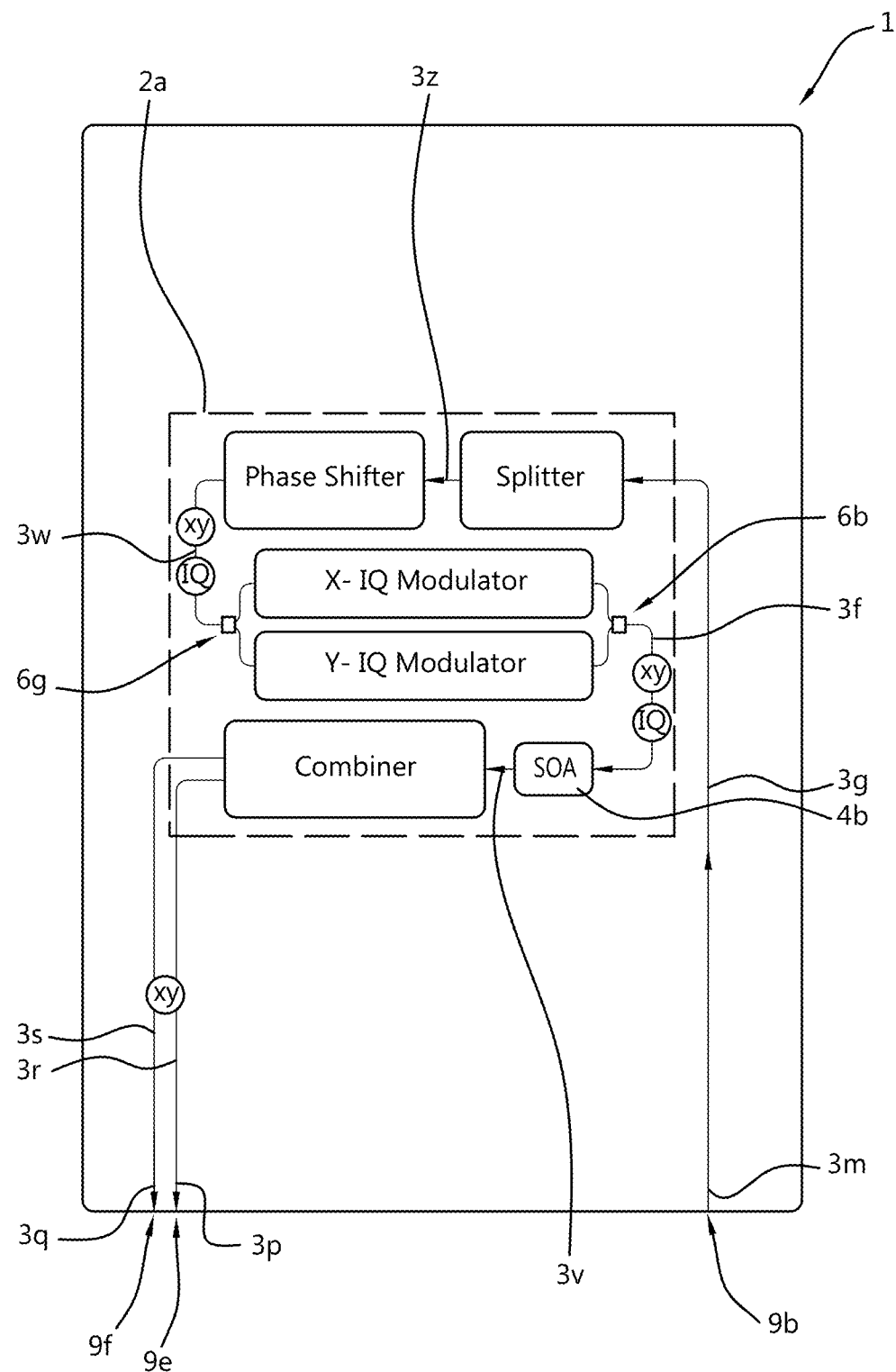
FIG. 3 shows a schematic top view of a second configuration of the first exemplary, non-limiting embodiment of the PIC shown in FIG. 1.

FIG. 3 shows a schematic top view of a second configuration of the first exemplary, non-limiting embodiment of the PIC 1 shown in FIG. 1, wherein the first controllable optical switch 4a and the third controllable optical switch 4c are configured to be in the second state in which optical transmission is prevented, and the second controllable optical switch 4b is configured to be in the first state in which optical transmission is allowed. As a result, the reconfigurable optical connection arrangement is configured to enable an optical access path comprising a second set of semiconductor-based optical waveguides 3g, 3m, 3p, 3q, 3r, 3s of the plurality of semiconductor-based optical waveguides to the first functional photonic block 2a that provides the PIC with the functionality of a coherent optical transmitter. In this way, the reconfigurable optical connection arrangement enables determining the performance of the coherent optical transmitter in a stand-alone manner, i.e. isolated from the PIC 1 as a whole. It is noted that the second functional photonic block 2b, the third functional photonic block 2c, the first controllable optical switch 4a, the third controllable optical switch 4b, and the semiconductor-based optical waveguides 3a-3e, 3h-3l, 3n, 3o, 3t, 3u, 3x, 3y of the plurality of semiconductor-based optical waveguides are not shown for the sake of clarity to emphasize the optically accessible part of the PIC 1 of which the performance can be determined.

Figure 4:
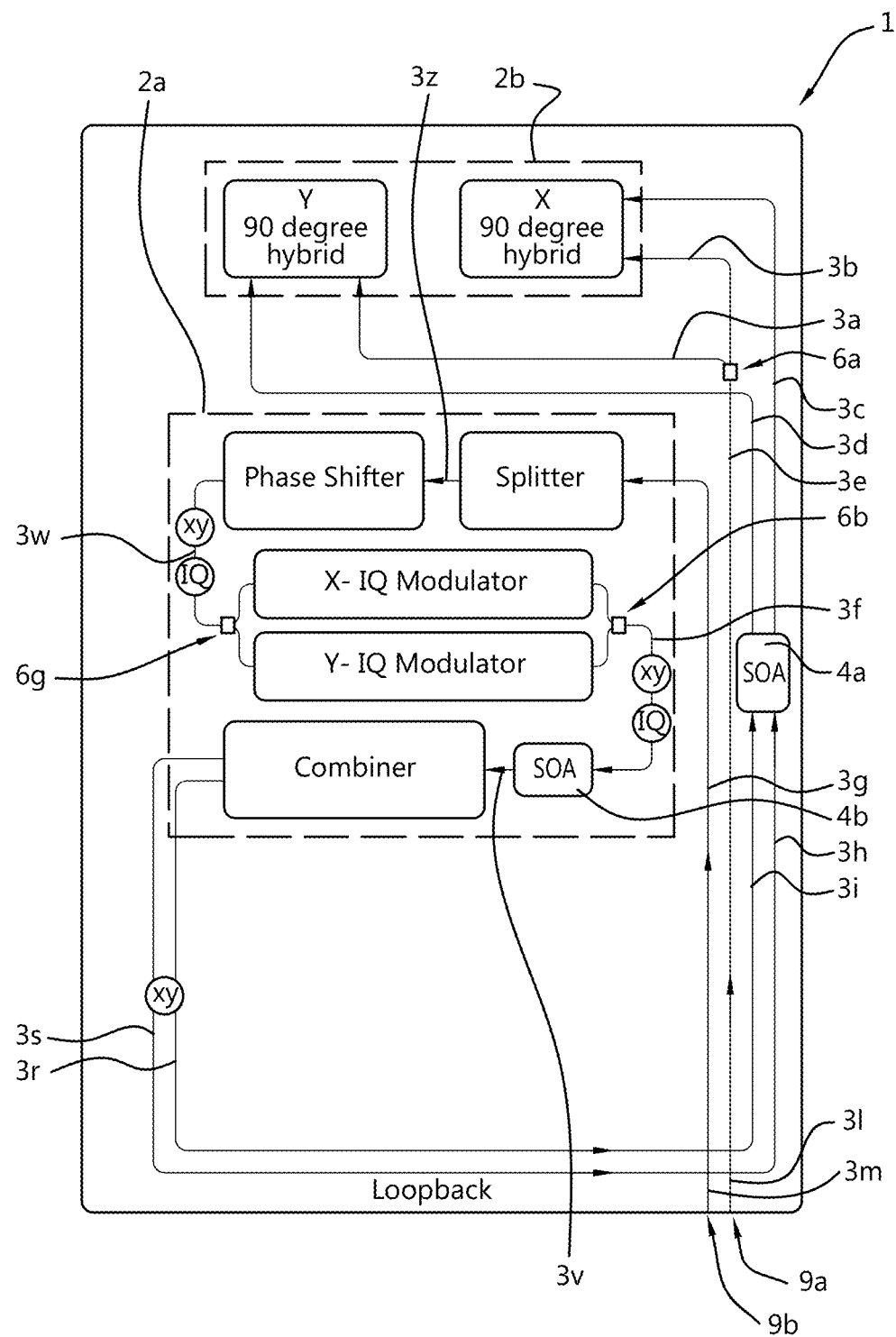
FIG. 4 shows a schematic top view of a third configuration of the first exemplary, non-limiting embodiment of the PIC shown in FIG. 1.

FIG. 4 shows a schematic top view of a third configuration of the first exemplary, non-limiting embodiment of the PIC 1 shown in FIG. 1, wherein the third controllable optical switch 4c is configured to be in the second state in which optical transmission is prevented, and the first controllable optical switch 4a and the second controllable optical switch 4b are configured to be in the first state in which optical transmission is allowed. As a result, the reconfigurable optical connection arrangement is configured to comprise another set of semiconductor based optical waveguides 3a, 3b, 3f, 3g, 3l, 3m of the plurality of semiconductor based optical waveguides to provide optical access paths between optical fiber to-chip coupling locations 9a, 9b of a plurality of optical fiber-to-chip coupling locations 9a, 9b, 9c, 9d, 9e, 9f, 9g, 9h shown in FIG. 1 and both the first functional photonic block 2a that provides the PIC with the functionality of a coherent optical transmitter and the second functional photonic block 2b that provides the PIC with the functionality of a coherent optical receiver. The reconfigurable optical connection arrangement is configured to also enable yet another set of semiconductor-based optical waveguides 3h, 3i, 3r, 3s to provide optical connections between the first functional photonic block 2a and the second functional photonic block 2b. In this way, the reconfigurable optical connection arrangement enables the overall performance of both the coherent optical transmitter functionality and the coherent optical receiver functionality to be determined in a so-called loopback test.

FIG. 4 shows that in accordance with the third configuration of the first exemplary, non-limiting embodiment of the PIC 1 shown in FIG. 1, the reconfigurable optical connection arrangement is configured to enable at least one external or off-chip light source such as a laser unit (not shown) to be optically connected with the semiconductor-based optical waveguides 3l, 3m of the PIC 1 via optical fibers (not shown) that are arranged at the fiber-to-chip coupling locations 9a, 9b. This will be elucidated in more detail with respect to FIGS. 8-10.

Figure 5:
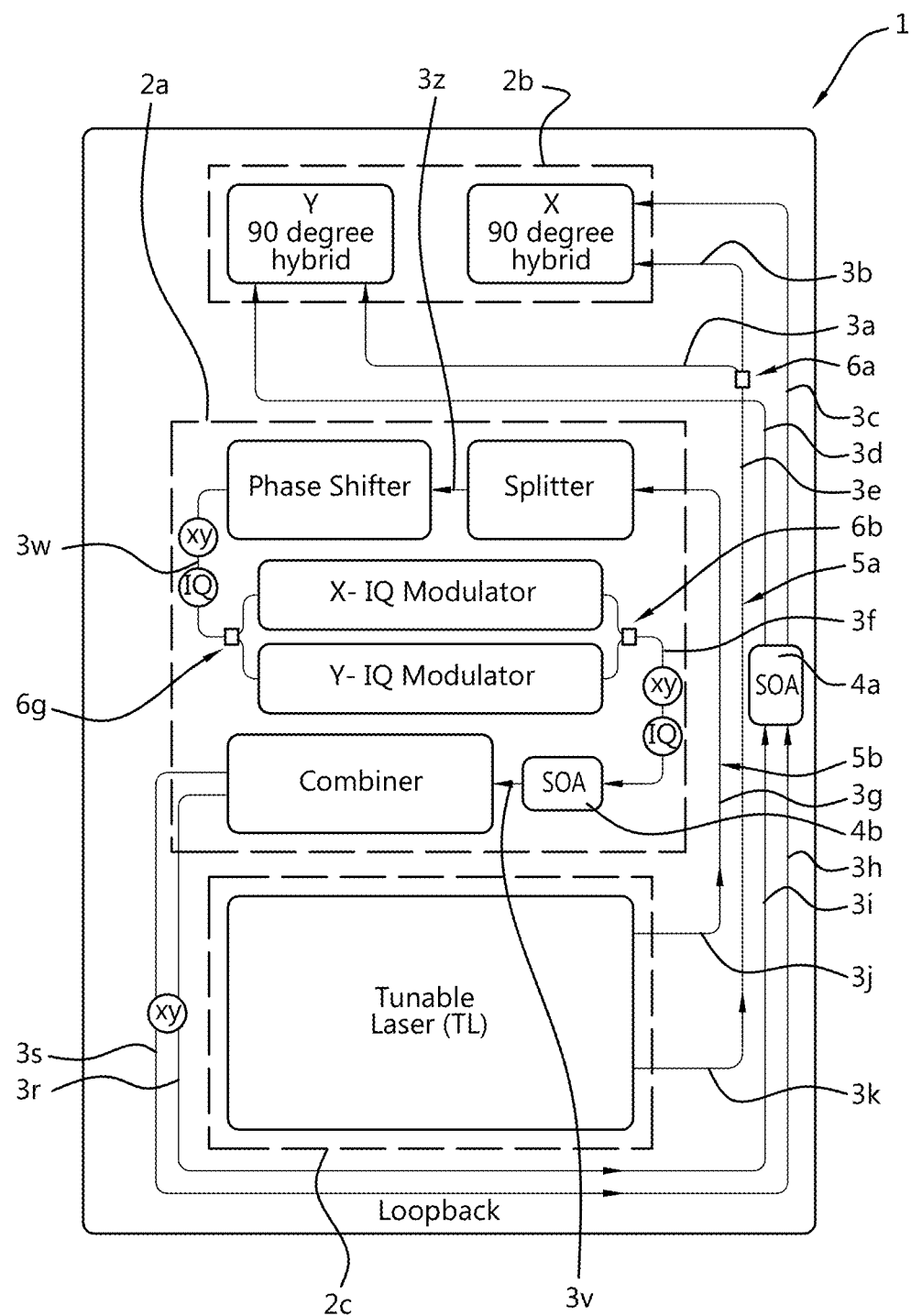
FIG. 5 shows a schematic top view of a fourth configuration of the first exemplary, non-limiting embodiment of the PIC shown in FIG. 1.

FIG. 5 shows a schematic top view of a fourth configuration of the first exemplary, non-limiting embodiment of the PIC 1 shown in FIG. 1, wherein the reconfigurable optical connection arrangement again is configured to enable a loopback test for determining the overall performance of both the coherent optical transmitter functionality that is provided by the first functional photonic block 2*a* and the coherent optical receiver functionality that is provided by the second functional photonic block 2*b*. However, in this case the reconfigurable optical connection arrangement is configured to include the on-chip light source, for example an integrated laser unit, of the third functional photonic block 2*c* in the loopback test and to use the on-chip light source as an on-chip optical local oscillator for determining the performance of the combination of the coherent optical transmitter and the coherent optical receiver only using the three functional photonic blocks 2*a*, 2*b*, 2*c* of the PIC 1.

Based on the different configurations of the first exemplary, non-limiting embodiment of the PIC 1 shown in FIGS. 2-5, the person skilled in the art will appreciate that the PIC 1 according to the present invention enables deconvoluting the overall performance of the PIC 1 to the level of an individual functional photonic block (FIGS. 2 and 3) and a set of functional photonic blocks that comprises less functional photonic blocks than the plurality of functional photonic blocks of the PIC 1 (FIGS. 4 and 5). In addition, it is possible to obtain an improved understanding of the overall performance of the PIC 1 and/or to optimize the overall performance of the PIC 1.

Figure 6:
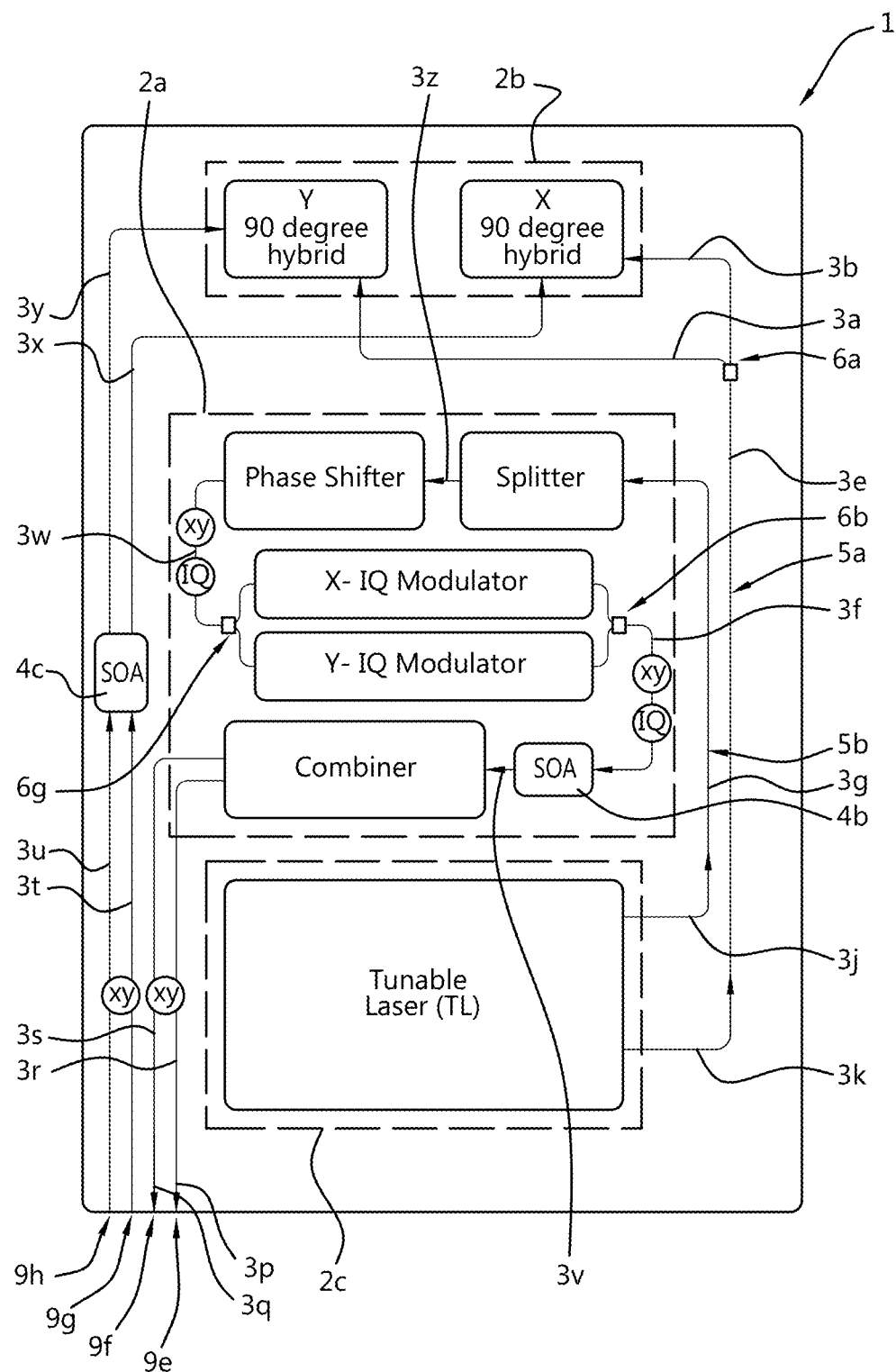
FIG. 6 shows a schematic top view of a fifth configuration of the first exemplary, non-limiting embodiment of the PIC shown in FIG. 1.

FIG. 6 shows a schematic top view of a fifth configuration of the first exemplary, non-limiting embodiment of the PIC 1 shown in FIG. 1, wherein the first controllable optical switch 4*a* is configured to be in the second state in which optical transmission is prevented, and the second controllable optical switch 4*b* and the third controllable optical switch 4*c* are configured to be in the first state in which optical transmission is allowed. As a result, the reconfigurable optical connection arrangement is configured to enable an optical access path comprising a further set of semiconductor-based optical waveguides 3*p*-3*u*, 3*x*, 3*y* of the plurality of semiconductor-based optical waveguides to both the first functional photonic block 2*a* that provides the PIC with the functionality of a coherent optical transmitter and the second functional photonic block 2*b* that provides the PIC with the functionality of a coherent optical receiver. The reconfigurable optical connection arrangement is configured to also enable yet a further set of semiconductor-based optical waveguides 3*a*, 3*b*, 3*e*, 3*k* to provide an optical connection 5*a* between the third functional photonic block 2*c* and the second functional photonic block 2*b*, and yet another set of semiconductor-based optical waveguides 3*g*, 3*j* to provide an optical connection 5*b* between the third functional photonic block 2*c* and the first functional photonic block 2*a*. In this way, the reconfigurable optical connection arrangement enables the PIC 1 to be in a so-called normal operation state.

Figure 7:
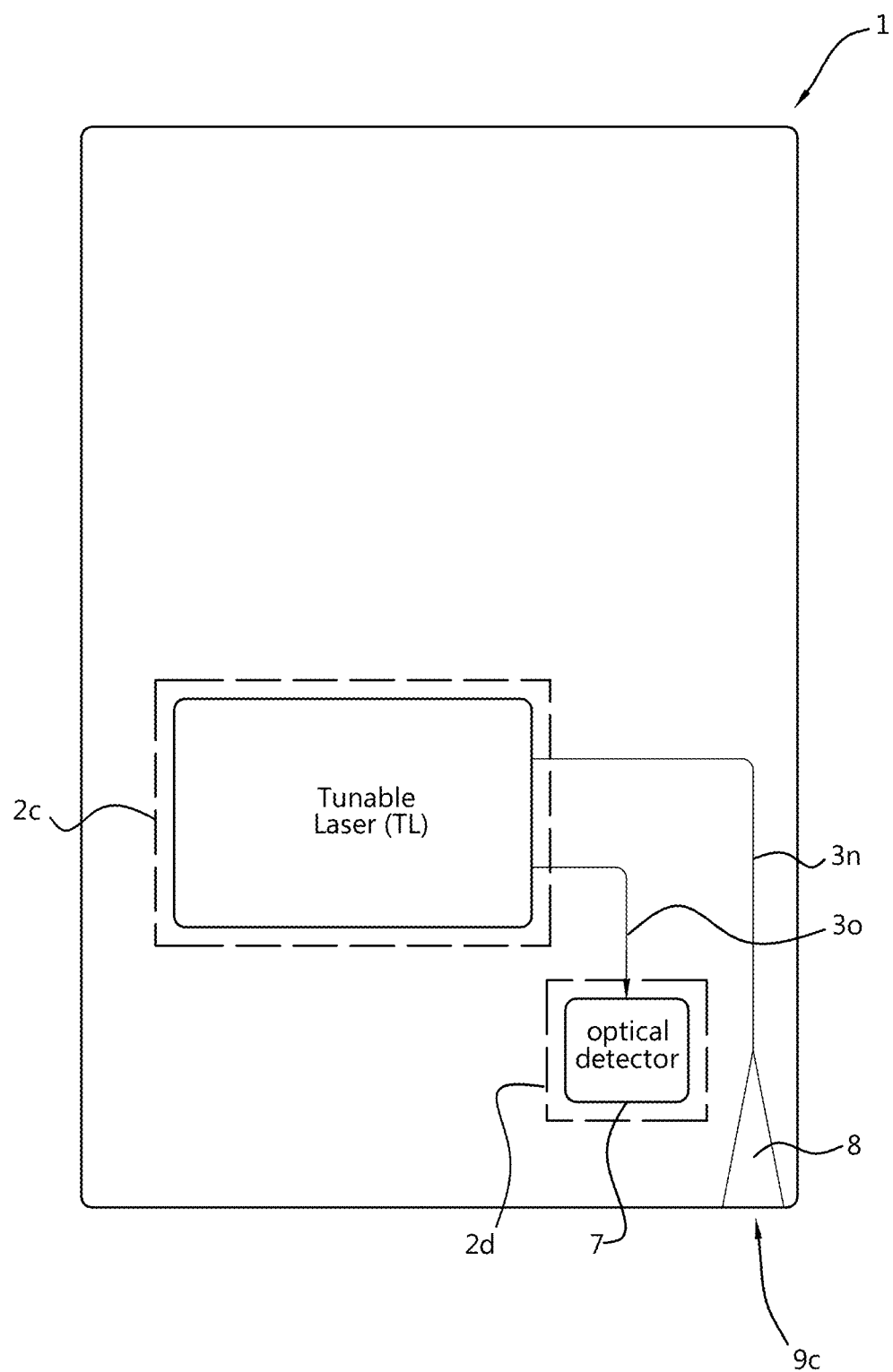
FIG. 7 shows a schematic top view of a first configuration of a second exemplary, non-limiting embodiment of the PIC according to the present invention.

FIG. 7 shows a schematic top view of a first configuration of a second exemplary, non-limiting embodiment of the PIC 1 according to the present invention, wherein the three controllable optical switches 4*a*-4*c* are configured to be in the second state in which optical transmission is prevented. As a result, the reconfigurable optical connection arrangement is configured to enable an optical access path comprising a set of semiconductor-based optical waveguides 3*n*, 3*o* of the plurality of semiconductor-based optical waveguides to the third functional photonic block 2*c*, i.e. the integrated tunable laser unit. In this way, the reconfigurable optical connection arrangement enables determining the performance of the integrated tunable laser unit in a stand-alone manner, i.e. isolated from the PIC 1 as a whole.

The semiconductor-based optical waveguide 3*n* comprises a tapered section 8. The person skilled in the art will appreciate that the tapered section 8 is configured and arranged to enable spot-size conversion of optical radiation for reducing coupling losses at the optical interface between the semiconductor-based optical waveguide 3*n* and an optical fiber (not shown) with which it can be optically connected. The optical fiber can be optically connected with an external optical detector (not shown) for determining the performance of the integrated tunable laser unit. Instead of an external optical detector, it is also possible to use an integrated optical detector 7 that is optically connected with the integrated laser unit via the semiconductor-based optical waveguide 3*o* of the configurable connection arrangement of the PIC 1 for determining the performance of the integrated tunable laser unit. The optical detector 7 can be an InP-based PD or an InP-based SOA. The person skilled in the art will appreciate that the PD is to be electrically reverse-biased in order to detect incident optical radiation, whereas the SOA does not need to be electrically reverse-biased. However, the SOA can be electrically reverse-biased, if required.

Figure 8:
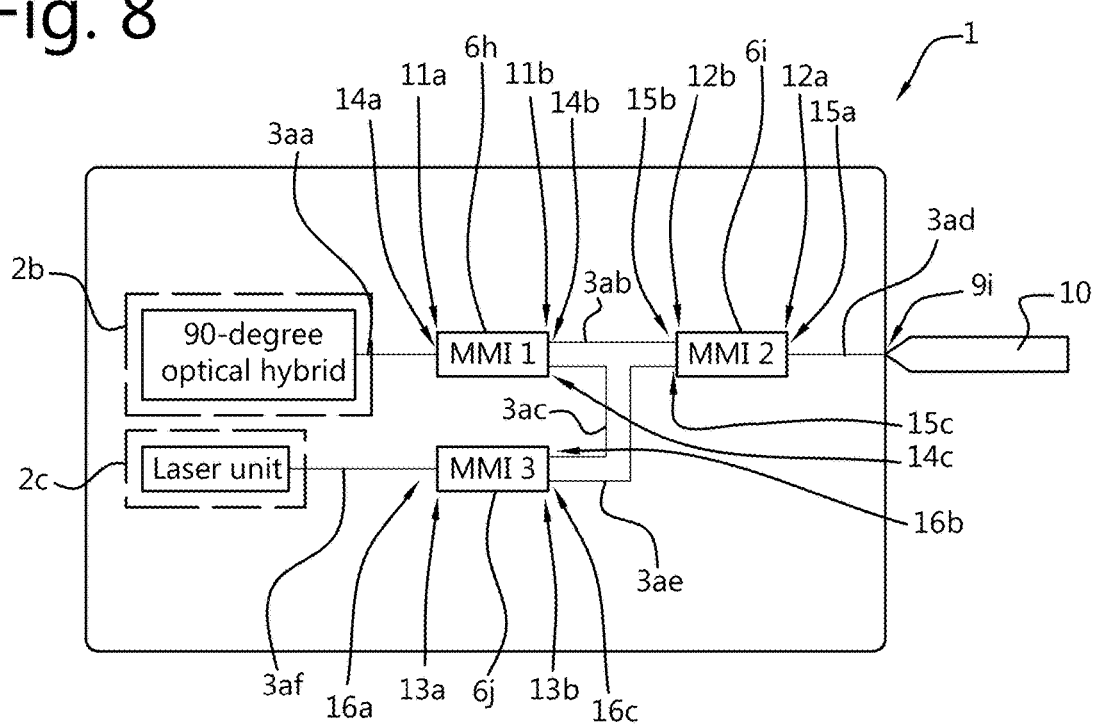
FIG. 8 shows a schematic top view of a first configuration of a third exemplary non-limiting embodiment of the PIC according to the present invention.

FIG. 8 shows a schematic top view of a first configuration of a third exemplary non-limiting embodiment of the PIC 1 according to the present invention. The second functional photonic block 2*b* provides the PIC 1 with the functionality of a coherent optical receiver that comprises a 90-degree optical hybrid. The 90-degree optical hybrid has been represented in a simplified form and it has been omitted to show the signal path into the 90-degree optical hybrid for the sake of simplicity. The third functional photonic block 2*c* provides the PIC 1 with the functionality of an on-chip light source. As mentioned above, the on-chip light source can be a laser unit comprising for example an integrated tunable laser.

FIG. 8 shows that the PIC 1 comprises a fiber-to-chip coupling location 9*i* that is optically connected with the 90-degree optical hybrid of the second functional photonic block 2*b* and the on-chip laser unit of the third functional photonic block 2*c* via the reconfigurable optical connection arrangement according to the present invention. The reconfigurable optical connection arrangement comprises a first set of three optical splitter-combiner units 6*h*, 6*i*, 6*j* and semiconductor-based optical waveguides 3*aa*-3*ah* of a third set of semiconductor-based optical waveguides 3*aa*-3*ah* of the plurality of semiconductor-based optical waveguides 3*a*-3*ah*. The first optical splitter-combiner unit 6*h* of said first set has a first end part 11*a* that is provided with a first optical interface 14*a* and a second end part 11*b* that is provided with a second optical interface 14*b* and a third optical interface 14*c*. The second optical splitter-combiner unit 6*i* of said first set has a third end part 12*a* that is provided with a fourth optical interface 15*a* and a fourth end part 12*b* that is provided with a fifth optical interface 15*b* and a sixth optical interface 15*c*. The third optical splitter-combiner unit 6*j* of said first set has a fifth end part 13*a* that is provided with a seventh optical interface 16*a* and a sixth end part 13*b* that is provided with an eighth optical interface 16*b* and a ninth optical interface 16*c*.

The first optical interface 14*a* of the first optical splitter-combiner unit 6*h* is optically interconnected with the 90-degree optical hybrid of the second functional photonic block 2*b* via a first semiconductor-based optical waveguide 3*aa* of said third set. The second optical interface 14*b* of the first optical splitter-combiner unit 6*h* is optically interconnected with the fifth optical interface 15*b* of the second optical splitter-combiner unit 6*i* via a second semiconductor-based optical waveguide 3*ab* of said third set. The third optical interface 14*c* of the first optical splitter-combiner unit 6*h* is optically interconnected with the eighth optical interface 16*b* of the third optical splitter-combiner unit 6*j* via a third semiconductor-based optical waveguide 3*ac* of said third set. The fourth optical interface 15*a* of the second optical splitter-combiner unit 6*i* is optically interconnected with the fiber-to-chip coupling location 9*i* via a fourth semiconductor-based optical waveguide 3*ad* of said third set. The sixth optical interface 15*c* of the second optical splitter-combiner unit 6*i* is optically interconnected with the ninth optical interface 16*c* of the third optical splitter-combiner unit 6*j* via a fifth semiconductor-based optical waveguide 3*ae* of said third set. The seventh optical interface 16*a* of the third optical splitter-combiner unit 6*j* is optically interconnected with the laser unit of the third functional photonic block 2*c* via a sixth semiconductor-based optical waveguide 3*af* of said third set.

An advantage of the embodiment of the integrated coherent optical receiver of the PIC 1 shown in FIG. 8 is that it enables optical monitoring of the on-chip or internal laser unit of the second functional photonic block 2*b* using off-chip or external measurement equipment that is optically connected with the fiber-to-chip coupling location 9*i* of the PIC 1 via an optical fiber 10. As a result of the possibility to optically monitor the performance of the on-chip or internal laser unit of the second functional photonic block 2*b*, calibration and in-line control of the on-chip laser unit can be improved.

Another advantage of the embodiment of the integrated coherent optical receiver of the PIC 1 shown in FIG. 8 is that in case of failure of the on-chip laser unit it is possible to substitute it with an off-chip laser unit that is optically connected with the fiber-to-chip coupling location 9*i* of the PIC 1 via an optical fiber 10. As a result of the possibility to substitute the on-chip laser unit with an off-chip laser unit the entire PIC 1 does not need to be discarded which would be expensive.

In accordance with the first configuration of the third exemplary non-limiting embodiment of the PIC 1, the optical splitter-combiner units 6*h*, 6*i*, 6*j* of said first set are MMI-based optical splitter-combiner units that are implemented as 1×2 MMIs. The person skilled in the art will appreciate that if in accordance with another exemplary embodiment of the PIC the third optical splitter-combiner unit 6*j* is replaced by for example a 2×2 MMI, another laser unit could be included that could be used as a second on-chip optical local oscillator. An advantage of including for example two half-band tunable laser units is that the yield of the PIC can be improved because the requirements for each individual laser unit can be lower, i.e. more relaxed.

Figure 9:
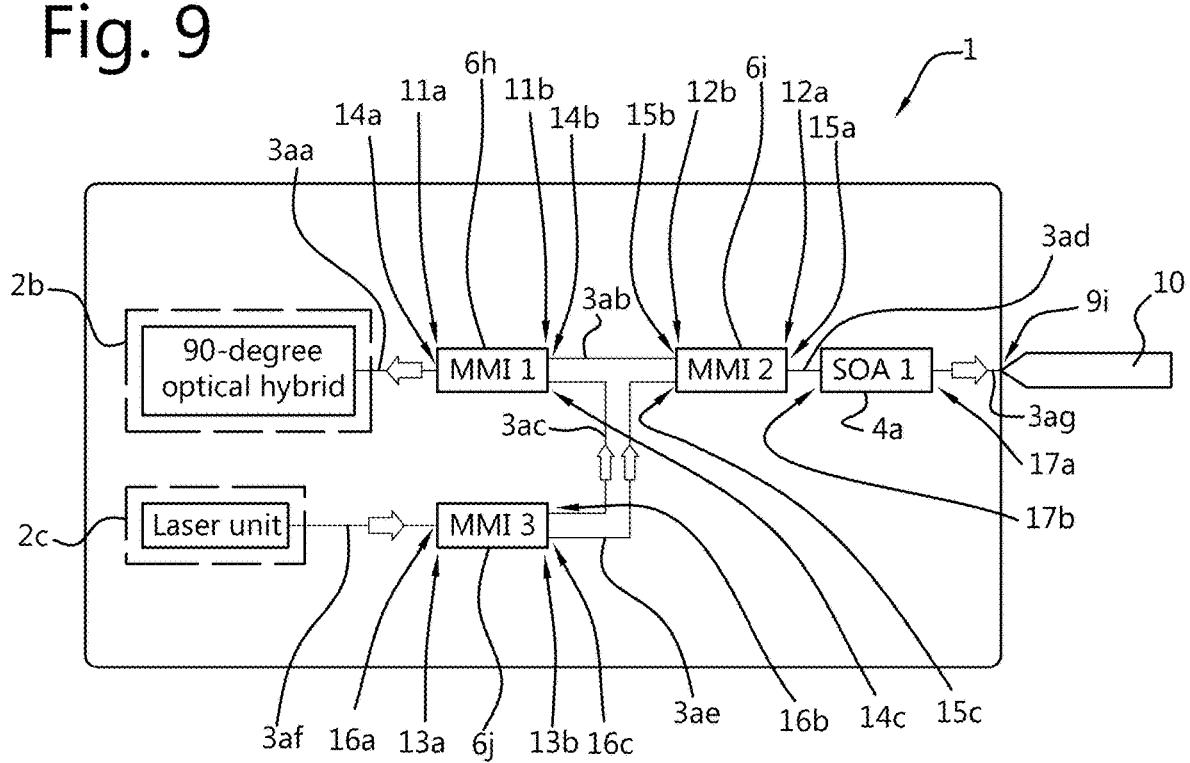
FIG. 9 shows a schematic top view of a second configuration of the third exemplary non-limiting embodiment of the PIC according to the present invention.

FIG. 9 shows a schematic top view of a second configuration of the third exemplary non-limiting embodiment of the PIC 1 according to the present invention. The reconfigurable optical connection arrangement comprises a first controllable optical switch 4*a* that has a first end facet 17*a* and a second end facet 17*b*. The first end facet 17*a* of the first controllable optical switch 4*a* is arranged in optical communication with the fiber-to-chip coupling location 9*i* of the PIC 1 via a seventh semiconductor-based optical waveguide 3*ag* of said third set, and the second facet 17*b* of the first controllable optical switch 4*a* is arranged in optical communication with the fourth optical interface 15*a* of the second optical splitter-combiner unit 6*i* via the fourth semiconductor-based optical waveguide 3*ad* of said third set.

By forward biasing the first controllable optical switch 4*a*, optical radiation that is emitted by the on-chip laser unit of the third functional photonic block 2*c* can be fed into the optical fiber 10 that is connected with the PIC 1 at the fiber-to-chip coupling location 9*i* via an optical path that includes the sixth semiconductor-based optical waveguide 3*af* of the third set, the third optical splitter-combiner unit 6*j*, the fifth semiconductor-based optical waveguide 3*ae* of the third set, the second optical splitter-combiner unit 6*i*, the fourth semiconductor-based optical waveguide 3*ad* of the third set, the first controllable optical switch 4*a*, and the seventh semiconductor-based optical waveguide 3*ag* of the third set. The afore-mentioned optical path is indicated in FIG. 9 with open block arrows. The optical fiber 10 can be optically connected with external or off-chip optical measurement equipment (not shown). In this way, the performance of the on-chip laser unit can be determined.

As mentioned above, the on-chip laser unit of the third functional photonic block 2*c* can be used as an optical local oscillator that is optically connected with the 90-degree optical hybrid of the second functional photonic block 2*b* via an optical path that includes the sixth semiconductor-based optical waveguide 3*af* of the third set, the third optical splitter-combiner unit 6*j*, the third semiconductor-based optical waveguide 3*ac* of the third set, the first optical splitter-combiner unit 6*h*, and the first semiconductor-based optical waveguide 3*aa* of the third set. The latter optical path is also indicated in FIG. 9 with open block arrows.

Figure 10:
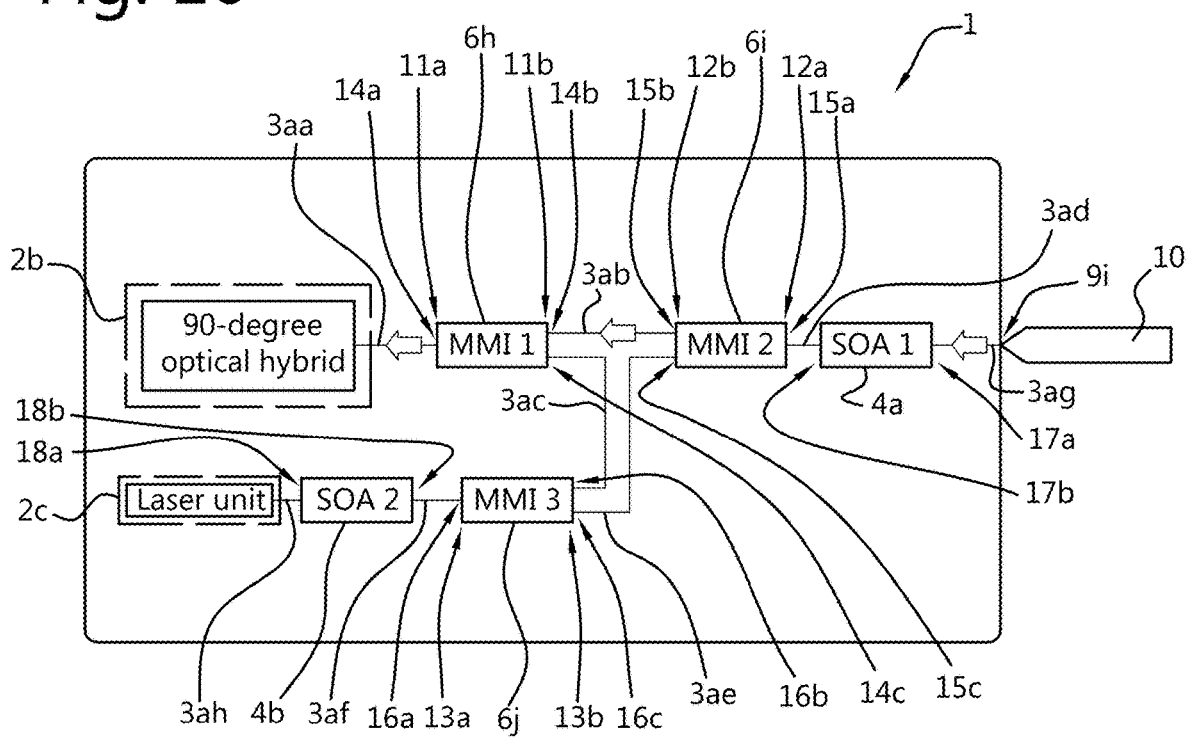
FIG. 10 shows a schematic top view of a third configuration of the third exemplary non-limiting embodiment of the PIC according to the present invention.

FIG. 10 shows a schematic top view of a third configuration of the third exemplary non-limiting embodiment of the PIC 1 according to the present invention. The third configuration of the third exemplary embodiment of the PIC 1 differs from the above-described second configuration of the third exemplary embodiment of the PIC 1 in that the reconfigurable optical connection arrangement shown in FIG. 10 comprises a second controllable optical switch 4*b* in addition to the first controllable optical switch 4*a* as described in relation to FIG. 9. The second controllable optical switch 4*b* has a third end facet 18*a* and a fourth end facet 18*b*. The third end facet 18*a* is arranged in optical communication with the laser unit of the third functional photonic block 2*c* via an eighth semiconductor-based optical waveguide 3*ah* of said third set. The fourth facet 18*b* is arranged in optical communication with the seventh optical interface 16*a* of the third optical splitter-combiner unit 6*j* via the sixth semiconductor-based optical waveguide 3*af* of said third set.

In the event that an external or off-chip laser unit (not shown) is used as an optical local oscillator for the 90-degree optical hybrid of the second functional photonic block 2*b*, the off-chip laser unit can be optically connected with the optical fiber 10 that is connected with the PIC 1 at the fiber-to-chip coupling location 9*i*. Upon forward biasing the first controllable optical switch 4*a*, optical radiation emitted by the off-chip laser unit can be guided towards the 90-degree optical hybrid of the second functional photonic block 2*b* via an optical path that includes the seventh semiconductor-based optical waveguide 3*ag* of the third set, the first controllable optical switch 4*a*, the fourth semiconductor-based optical waveguide 3*ad* of the third set, the second optical splitter-combiner unit 6*i*, the second semiconductor-based optical waveguide 3*ab* of the third set, the first optical splitter-combiner unit 6*h*, and the first semiconductor-based optical waveguide 3*aa* of the third set. The latter optical path is indicated in FIG. 10 with open block arrows. In addition, the first controllable optical switch 4*a* can boost the optical radiation emitted by the off-chip laser unit.

The person skilled in the art will appreciate that in the event that an external or off-chip laser unit is optically connected with the PIC 1, it is advantageous to reverse bias the second controllable optical switch 4b. In this way, it can be prevented that optical radiation that is emitted by the off-chip laser unit can enter the laser cavity of the inactive on-chip laser unit. As a result, undesirable resonances can be prevented.

In the event that the on-chip laser unit of the third functional photonic block 2c is used as optical local oscillator, the second controllable optical switch 4b can be forward biased to boost the optical radiation that is emitted by the on-chip laser unit. If off-chip monitoring of the radiation emitted by the on-chip laser unit is desired, the first controllable optical switch 4a can also be forward biased. If this is not desired, the first controllable optical switch 4a can be reverse biased to reduce and ultimately eliminate reflections of optical radiation emitted by the on-chip or internal laser unit at the fiber-to-chip coupling location 9i.

FIG. 11 shows a schematic top view of a first exemplary, non-limiting embodiment of an opto-electronic system 100 that comprises a PIC 1 according to the present invention. The opto-electronic system 100 can be used for example, but not exclusively, for telecommunication applications, LIDAR or sensor applications. In case the opto-electronic system 100 is used for telecommunication applications, it can for example be one of a transmitter, a receiver, a transceiver, a coherent transmitter, a coherent receiver and a coherent transceiver.

In accordance with the first exemplary, non-limiting embodiment of the opto-electronic system 100 shown in FIG. 11, the opto-electronic system 100 further comprises a control unit 101 that is operatively connected with the PIC 1. The control unit 101 can be configured and arranged to generate a control signal to configure the reconfigurable optical connection arrangement to enable at least a first set of semiconductor-based optical waveguides of the plurality of semiconductor-based optical waveguides to provide at least one optical connection 5a, 5b between at least two functional photonic blocks of the plurality of functional photonic blocks 2a-2d and/or a first optical access path to at least one functional photonic block of the plurality of functional photonic blocks 2a-2d.

By configuring the control unit to be able to generate a control signal for controlling the controllable optical switches of the reconfigurable optical connection arrangement in accordance with a predefined control scheme, the reconfigurable optical connection arrangement can be configured to allow an automated test sequence to be run for determining the performance of at least one of an individual functional photonic block, a set of individual functional blocks, and all functional photonic blocks of the plurality of functional photonic blocks 2a-2d of the PIC 1.

It is also possible that the control unit 101 generates a control signal in accordance with a control input of an operator. In this way, manual control of the controllable optical switches 4a-4c of the reconfigurable optical connection arrangement can be enabled. The person skilled in the art will appreciate that the manual control can also be used to adjust or cancel a control input that would have been provided in accordance with a predefined control scheme for controlling the controllable optical switches 4a-4c of the configurable optical connection arrangement.

Furthermore, it is noted that the control unit 101 can be configured and arranged in any suitable way, i.e. it can be integrated on the same die as the PIC 1 as shown in FIG. 11 or it can be an external control unit that is operatively connected, in a wired and/or wireless way, with the PIC 1.

FIG. 12 shows a flow chart of a first exemplary, non-limiting embodiment of the method 200 according to the invention, which is a method of improved determination of an overall performance of a PIC 1 according to the invention. The person skilled in the art will appreciate that the steps 201-208 of the first exemplary, non-limiting embodiment of the method 200 as shown in FIG. 12, can relate to a PIC 1 and for that matter to an opto-electronic system 100 comprising a PIC 1 that has any one of the features or combinations of features that are disclosed herein. Accordingly, the disclosure of the FIGS. 1 to 8 and the aspects of the earlier discussions having regard to the PIC 1 and the opto-electronic system 100 are hereby incorporated into the present discussion of the first exemplary, non-limiting embodiment of the method 200.

FIG. 12 shows that the first exemplary, non-limiting embodiment of the method 200 involves a first step 201 of generating a control signal in accordance with a predefined control scheme to configure the configurable optical connection arrangement, and a second step 202 of generating a test signal in accordance with a predefined test scheme. The predefined test scheme can comprise a sequence of test patterns including but not limited to at least one of data sequences, single tones and multi-tones.

The method 200 also involves a third step 203 of providing the generated test signal to a functional photonic block of the plurality of functional photonic blocks 2a-2d, and a fourth step of determining 204 a performance of the functional photonic block.

The person skilled in the art will appreciate that in accordance with the above-mentioned four steps 201-204 of the first exemplary, non-limiting embodiment of the method 200, it is possible to determine the performance of at least an individual functional photonic block of the plurality of functional photonic blocks 2a-2d of the PIC 1. In addition, it is noted that the method 200 allows determining the performance of at least an individual functional photonic block only using on-chip components of the PIC 1 such as for example a laser unit and/or an optical detector that are part of functional photonic blocks of which the performance is not to be determined. In that case, the method 200 according to the invention allows to perform a so-called optical built-in self-test (BIST).

The first exemplary, non-limiting embodiment of the method 200 further involves a fifth step 205 of comparing the determined performance of the at least one functional photonic block with a predefined performance of the at least one functional photonic block, a sixth step 206 of determining an offset between the determined performance and the predefined performance of the at least one functional photonic block, a seventh step 207 of generating a calibration signal in accordance with the determined offset to at least reduce the determined offset, and an eighth step 208 of providing the calibration signal to the at least one functional photonic block of the plurality of functional photonic blocks 2a-2d.

The person skilled in the art will appreciate that in accordance with the last-mentioned four steps 205-208 of the first exemplary, non-limiting embodiment of the method 200, it is possible to improve the overall performance of the PIC 1 by performing a calibration of at least an individual functional photonic block of the PIC 1. In addition, the person skilled in the art will appreciate that the first exemplary, non-limiting embodiment of the method 200, for example in the form of an optical BIST, can be relevant for both initial testing and testing during lifetime of at least one individual functional photonic block of the PIC 1. If the method 200 according to the invention is performed, the PIC 1 is in a so-called measurement state, whereas after completion of the method 200, the PIC 1 is in so-called normal operation state.

Based on the above, it will be appreciated that the method 200 according to the invention enables deconvolution of the overall performance of the PIC 1 to the level of at least an individual functional photonic block. Consequently, an improved understanding of the overall performance of the PIC 1 can be obtained and/or the overall performance of the PIC 1 can be improved.

The present invention can be summarized as relating to a PIC 1 comprising a plurality of optically interconnectable functional photonic blocks 2a, 2b, 2c and a reconfigurable optical connection arrangement comprising a plurality of semiconductor-based optical waveguides and a plurality of controllable optical switches 4a, 4b, 4c, at least one controllable optical switch being configurable to be in a first state allowing optical transmission or a second state preventing optical transmission. Depending on the respective first or second state of the at least one controllable optical switch, said optical connection arrangement is configured to enable at least a first set of semiconductor-based optical waveguides to provide at least one optical connection between at least two functional photonic blocks and/or a first optical access path to at least one functional photonic block. The invention also relates to an opto-electronic system 100 comprising said PIC and to a method 200 of improved determination of an overall performance of said PIC.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

What is claimed is:

1. A photonic integrated circuit, PIC, comprising:
   a plurality of optically interconnectable functional photonic blocks; and
   a reconfigurable optical connection arrangement that comprises:
   a plurality of semiconductor-based optical waveguides; and
   a plurality of controllable optical switches, at least one of the controllable optical switches in response to a control signal being configurable to be in:
   a first state in which optical transmission is allowed; or
   a second state in which optical transmission is prevented;
   wherein depending on the respective first state or second state of the at least one controllable optical switch of the plurality of controllable optical switches, the reconfigurable optical connection arrangement is configured to enable at least a first set of semiconductor-based optical waveguides of the plurality of semiconductor-based optical waveguides to provide:
   at least one optical connection between at least two functional photonic blocks of the plurality of functional photonic blocks; and/or
   a first optical access path to at least one functional photonic block of the plurality of functional photonic blocks;
   wherein a first functional photonic block of the plurality of functional photonic blocks is configured and arranged to provide at least a part of an optical transmitter or a coherent optical transmitter, and a second functional photonic block of the plurality of functional photonic blocks is configured and arranged to provide at least a part of an optical receiver or a coherent optical receiver,
   wherein the second functional photonic block of the plurality of functional photonic blocks comprises a 90-degree optical hybrid and a third functional photonic block of the plurality of functional photonic blocks comprises a laser unit, and
   wherein the PIC comprises a fiber-to-chip coupling location that is optically connected with the 90-degree optical hybrid of the second functional photonic block and the laser unit of the third functional photonic block via the reconfigurable optical connection arrangement that comprises a first set of at least three optical splitter-combiner units and a third set of semiconductor-based optical waveguides of the plurality of semiconductor-based optical waveguides, wherein:
   a first optical splitter-combiner unit of said first set has a first end part that is provided with at least a first optical interface and a second end part that is provided with at least a second optical interface and a third optical interface;
   a second optical splitter-combiner unit of said first set has a third end part that is provided with at least a fourth optical interface and a fourth end part that is provided with at least a fifth optical interface and a sixth optical interface;
   a third optical splitter-combiner unit of said first set has a fifth end part that is provided with at least a seventh optical interface and a sixth end part that is provided with at least an eighth optical interface and a ninth optical interface;
   the first optical interface of the first optical splitter-combiner unit is optically interconnected with the 90-degree optical hybrid of the second functional photonic block via a first semiconductor-based optical waveguide of said third set;
   the second optical interface of the first optical splitter-combiner unit is optically interconnected with the fifth optical interface of the second optical splitter-combiner unit via a second semiconductor-based optical waveguide of said third set;
   the third optical interface of the first optical splitter-combiner unit is optically interconnected with the eighth optical interface of the third optical splitter-combiner unit via a third semiconductor-based optical waveguide of said third set;

the fourth optical interface of the second optical splitter-combiner unit is optically interconnected with the fiber-to-chip coupling location via a fourth semiconductor-based optical waveguide of said third set;

the sixth optical interface of the second optical splitter-combiner unit is optically interconnected with the ninth optical interface of the third optical splitter-combiner unit via a fifth semiconductor-based optical waveguide of said third set; and the seventh optical interface of the third optical splitter-combiner unit is optically interconnected with the laser unit of the third functional photonic block via a sixth semiconductor-based optical waveguide of said third set.

2. The PIC according to claim 1, wherein depending on the respective first state or second state of the at least one controllable optical switch of the plurality of controllable optical switches, the reconfigurable optical connection arrangement is configured to enable a second set of semiconductor-based optical waveguides of the plurality of semiconductor-based optical waveguides to provide:

optical connections between at least a first set of functional photonic blocks of the plurality of functional photonic blocks, the first set of functional photonic blocks comprising at least two functional photonic blocks and less functional photonic blocks than the plurality of functional photonic blocks; and/or a second optical access path to at least one functional photonic block of the first set of functional photonic blocks.

3. The PIC according to claim 1, wherein the reconfigurable optical connection arrangement comprises at least one optical splitter-combiner unit that is arranged in optical connection with at least one semiconductor-based optical waveguide of the plurality of semiconductor-based optical waveguides, wherein the at least one optical splitter-combiner unit is a multimode interference-based, MMI-based, optical splitter-combiner unit.

4. The PIC according to claim 2, wherein the reconfigurable optical connection arrangement comprises at least one optical splitter-combiner unit that is arranged in optical connection with at least one semiconductor-based optical waveguide of the plurality of semiconductor-based optical waveguides, wherein the at least one optical splitter-combiner unit is a multimode interference-based, MMI-based, optical splitter-combiner unit.

5. The PIC according to claim 1, wherein the reconfigurable optical connection arrangement comprises:

an optical detector that is arranged in optical connection with at least one semiconductor-based optical waveguide of the plurality of semiconductor-based optical waveguides and at least one functional photonic block of the plurality of functional photonic blocks.

6. The PIC according to claim 1, wherein at least one controllable optical switch of the plurality of controllable optical switches comprises an indium phosphide-based, InP-based, semiconductor optical amplifier, SOA.

7. The PIC according to claim 1, wherein the reconfigurable optical connection arrangement comprises:

a first controllable optical switch of the plurality of controllable optical switches that has a first end facet and a second end facet; and/or a second controllable optical switch of the plurality of controllable optical switches that has a third end facet and a fourth end facet;

wherein:

the first end facet of the first controllable optical switch is arranged in optical communication with the fiber-to-chip coupling location of the PIC via a seventh semiconductor-based optical waveguide of said third set, and the second facet of the first controllable optical switch is arranged in optical communication with the fourth optical interface of the second optical splitter-combiner unit via the fourth semiconductor-based optical waveguide of said third set; and/or the third end facet of the second controllable optical switch is arranged in optical communication with the laser unit of the third functional photonic block via an eighth semiconductor-based optical waveguide of said third set, and the fourth facet of the second controllable optical switch is arranged in optical communication with the seventh optical interface of the third optical splitter-combiner unit via the sixth semiconductor-based optical waveguide of said third set.

8. The PIC according to claim 1, wherein the plurality of controllable optical switches comprises at least three controllable optical switches.

9. The PIC according to claim 1, wherein the PIC is a hybrid PIC or an InP-based monolithic PIC.

10. An opto-electronic system comprising a PIC according to claim 1.

11. The opto-electronic system according to claim 10, comprising a control unit that is operatively connected with at least one of the controllable optical switches of the plurality of controllable optical switches of the reconfigurable optical connection arrangement of the PIC, the control unit being configured to generate a control signal in accordance with a control input provided by an operator and/or a predefined control scheme, the control signal being configured to allow at least one controllable optical switch of the plurality of controllable optical switches to be configured in said first state or in said second state, wherein depending on the respective first state or second state of the at least one controllable optical switch of the plurality of controllable optical switches, the reconfigurable optical connection arrangement is configured to enable at least the first set of semiconductor-based optical waveguides of the plurality of semiconductor-based optical waveguides to provide:

at least one optical connection between at least two functional photonic blocks of the plurality of functional photonic blocks; and/or the first optical access path to at least one functional photonic block of the plurality of functional photonic blocks.

12. A method of improved determination of an overall performance of a PIC that comprises:

a plurality of optically interconnectable functional photonic blocks; and a reconfigurable optical connection arrangement that comprises:

a plurality of semiconductor-based optical waveguides; and a plurality of controllable optical switches, at least one of the controllable optical switches in response to a control signal being configurable to be in:

a first state in which optical transmission is allowed; or a second state in which optical transmission is prevented;

wherein depending on the respective first state or second state of the at least one controllable optical switch of the plurality of controllable optical switches, the reconfigurable optical connection arrangement is configured to enable at least a first set of semiconductor-based optical waveguides of the plurality of semiconductor-based optical waveguides to provide:
at least one optical connection between at least two functional photonic blocks of the plurality of functional photonic blocks; and/or
a first optical access path to at least one functional photonic block of the plurality of functional photonic blocks;
wherein a first functional photonic block of the plurality of functional photonic blocks is configured and arranged to provide at least a part of an optical transmitter or a coherent optical transmitter, and a second functional photonic block of the plurality of functional photonic blocks is configured and arranged to provide at least a part of an optical receiver or a coherent optical receiver,
wherein the second functional photonic block of the plurality of functional photonic blocks comprises a 90-degree optical hybrid and a third functional photonic block of the plurality of functional photonic blocks comprises a laser unit, and
wherein the PIC comprises a fiber-to-chip coupling location that is optically connected with the 90-degree optical hybrid of the second functional photonic block and the laser unit of the third functional photonic block via the reconfigurable optical connection arrangement that comprises a first set of at least three optical splitter-combiner units and a third set of semiconductor-based optical waveguides of the plurality of semiconductor-based optical waveguides, wherein:
a first optical splitter-combiner unit of said first set has a first end part that is provided with at least a first optical interface and a second end part that is provided with at least a second optical interface and a third optical interface;
a second optical splitter-combiner unit of said first set has a third end part that is provided with at least a fourth optical interface and a fourth end part that is provided with at least a fifth optical interface and a sixth optical interface;
a third optical splitter-combiner unit of said first set has a fifth end part that is provided with at least a seventh optical interface and a sixth end part that is provided with at least an eighth optical interface and a ninth optical interface;
the first optical interface of the first optical splitter-combiner unit is optically interconnected with the 90-degree optical hybrid of the second functional photonic block via a first semiconductor-based optical waveguide of said third set;
the second optical interface of the first optical splitter-combiner unit is optically interconnected with the fifth optical interface of the second optical splitter-combiner unit via a second semiconductor-based optical waveguide of said third set;
the third optical interface of the first optical splitter-combiner unit is optically interconnected with the eighth optical interface of the third optical splitter-combiner unit via a third semiconductor-based optical waveguide of said third set;
the fourth optical interface of the second optical splitter-combiner unit is optically interconnected with the fiber-to-chip coupling location via a fourth semiconductor-based optical waveguide of said third set;
the sixth optical interface of the second optical splitter-combiner unit is optically interconnected with the ninth optical interface of the third optical splitter-combiner unit via a fifth semiconductor-based optical waveguide of said third set; and
the seventh optical interface of the third optical splitter-combiner unit is optically interconnected with the laser unit of the third functional photonic block via a sixth semiconductor-based optical waveguide of said third set;
wherein the method comprises:
generating a control signal in accordance with a control input provided by an operator and/or a predefined control scheme to configure at least one controllable optical switch to be in a first state in which optical transmission is allowed or in a second state in which optical transmission is prevented to configure the reconfigurable optical connection arrangement to enable at least the first set of semiconductor-based optical waveguides of the plurality of semiconductor-based optical waveguides to provide at least one optical connection between at least two functional photonic blocks of the plurality of functional photonic blocks and/or the first optical access path to at least one functional photonic block of the plurality of functional photonic blocks;
generating a test signal in accordance with a test input provided by an operator and/or a predefined test scheme;
providing the generated test signal to the at least one functional photonic block of the plurality of functional photonic blocks; and
determining a performance of the at least one functional photonic block of the plurality of functional photonic blocks;
comparing the determined performance of the at least one functional photonic block with a predefined performance of the at least one functional photonic block;
determining an offset between the determined performance and the predefined performance of the at least one functional photonic block;
generating a calibration signal in accordance with the determined offset to at least reduce the determined offset; and
providing the calibration signal to the at least one functional photonic block of the plurality of functional photonic blocks.

* * * * *